United States Patent
Allan

(10) Patent No.: US 9,954,765 B2
(45) Date of Patent: Apr. 24, 2018

(54) GRAPH CONSTRUCTION FOR COMPUTED SPRING MULTICAST

(71) Applicant: Telefonaktiebolaget LM Ericsson (publ), Stockholm (SE)

(72) Inventor: David Ian Allan, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 59 days.

(21) Appl. No.: 15/076,546

(22) Filed: Mar. 21, 2016

(65) Prior Publication Data

US 2017/0201451 A1    Jul. 13, 2017

Related U.S. Application Data

(60) Provisional application No. 62/276,739, filed on Jan. 8, 2016.

(51) Int. Cl.
*H04L 12/721* (2013.01)
*H04L 12/761* (2013.01)
(Continued)

(52) U.S. Cl.
CPC .......... *H04L 45/12* (2013.01); *H04L 12/185* (2013.01); *H04L 45/16* (2013.01); *H04L 45/48* (2013.01); *H04L 65/4076* (2013.01)

(58) Field of Classification Search
CPC ......... H04L 45/12; H04L 45/16; H04L 45/48; H04L 12/185; H04L 65/4076
See application file for complete search history.

(56) References Cited

U.S. PATENT DOCUMENTS 6,778,531 B1   8/2004  Kodialam et al.
7,830,787 B1  11/2010  Wijnands et al.
(Continued)

FOREIGN PATENT DOCUMENTS

CN      102142970 B    12/2013
EP        2940938 A1    11/2015
WO    2014139564 A1     9/2014

OTHER PUBLICATIONS

U.S. Appl. No. 13/594,076, Notice of Allowance, dated Jun. 18, 2014, 9 pages.
(Continued)

*Primary Examiner* — Brian D Nguyen
(74) *Attorney, Agent, or Firm* — NDWE, LLP

(57) ABSTRACT

A method is provided that is implemented by a network device to simplify a topology graph of a network to generate a multicast distribution tree, the method to reduce the complexity of the topology graph while enabling a creation of the multicast distribution tree such that the computational complexity of generating the multicast distribution tree is reduced, the method including computing a shortest path to all nodes of the topology graph rooted at a source node S, determining a metric for each adjacency on each shortest path of the topology graph for the multicast group G, construct an (S, G) graph with only source node S, leaves and candidate replication points, and prune the (S, G) graph using a set of pruning processes to fully resolve the multicast distribution tree, where full resolution can be determined, and the first set of pruning processes if successful are known to produce a minimum cost tree.

24 Claims, 22 Drawing Sheets

(51) Int. Cl.
*H04L 29/06* (2006.01)
*H04L 12/18* (2006.01)
*H04L 12/753* (2013.01)

(56) References Cited

U.S. PATENT DOCUMENTS

| | | |
|---|---|---|
| 8,005,081 B2 | 8/2011 | Bragg et al. |
| 8,121,056 B1 | 2/2012 | Aggarwal et al. |
| 8,223,668 B2 | 7/2012 | Allan et al. |
| 8,307,422 B2 | 11/2012 | Varadhan et al. |
| 8,488,603 B2 | 7/2013 | Zha et al. |
| 8,811,388 B2 | 8/2014 | Fedyk |
| 8,867,367 B2 | 10/2014 | Allan et al. |
| 8,953,590 B1 | 2/2015 | Aggarwal et al. |
| 9,112,848 B2 | 8/2015 | Allan et al. |
| 9,430,262 B1 | 8/2016 | Felstaine et al. |
| 2003/0085931 A1 | 5/2003 | Card et al. |
| 2007/0133568 A1 | 6/2007 | Qing et al. |
| 2007/0140107 A1 | 6/2007 | Eckert et al. |
| 2007/0171851 A1 | 7/2007 | Beckmann |
| 2008/0144644 A1 | 6/2008 | Allan et al. |
| 2008/0279101 A1 | 11/2008 | Wu et al. |
| 2008/0298360 A1 | 12/2008 | Wijnands et al. |
| 2009/0310538 A1 | 12/2009 | Lee et al. |
| 2010/0020797 A1 | 1/2010 | Casey et al. |
| 2010/0281106 A1 | 11/2010 | Ashwood-Smith |
| 2010/0316056 A1 | 12/2010 | Unbehagen |
| 2011/0170403 A1 | 7/2011 | Ashwood-Smith et al. |
| 2011/0202761 A1* | 8/2011 | Sarela ............... H04L 12/189 713/163 |
| 2011/0228780 A1 | 9/2011 | Ashwood-Smith et al. |
| 2011/0273980 A1 | 11/2011 | Ashwood Smith |
| 2011/0305239 A1 | 12/2011 | Chandrashekharachar Suvarneshwar |
| 2012/0063451 A1 | 3/2012 | Keesara et al. |
| 2012/0075988 A1 | 3/2012 | Lu et al. |
| 2012/0106347 A1 | 5/2012 | Allan et al. |
| 2012/0147885 A1 | 6/2012 | Johri et al. |
| 2012/0177041 A1 | 7/2012 | Berman |
| 2012/0177042 A1 | 7/2012 | Berman |
| 2012/0177043 A1 | 7/2012 | Berman |
| 2012/0201539 A1 | 8/2012 | Boertjes et al. |
| 2012/0233350 A1 | 9/2012 | Unbehagen et al. |
| 2012/0300774 A1 | 11/2012 | Casey et al. |
| 2013/0010790 A1 | 1/2013 | Shao |
| 2013/0114466 A1 | 5/2013 | Koponen et al. |
| 2013/0114595 A1 | 5/2013 | Mack-Crane et al. |
| 2013/0142511 A1 | 6/2013 | Spraggs et al. |
| 2013/0195111 A1 | 8/2013 | Allan et al. |
| 2013/0259046 A1 | 10/2013 | Ramesh |
| 2014/0036913 A1 | 2/2014 | Olofsson et al. |
| 2014/0064063 A1 | 3/2014 | Holness et al. |
| 2014/0086097 A1 | 3/2014 | Qu et al. |
| 2014/0092898 A1 | 4/2014 | Berman |
| 2014/0112188 A1 | 4/2014 | Keesara et al. |
| 2014/0126422 A1 | 5/2014 | Bragg |
| 2014/0211797 A1 | 7/2014 | Luo et al. |
| 2014/0376366 A1 | 12/2014 | Li et al. |
| 2015/0156106 A1 | 6/2015 | Allan |
| 2015/0188771 A1 | 7/2015 | Allan et al. |
| 2015/0319007 A1 | 11/2015 | Allan et al. |
| 2016/0028625 A1 | 1/2016 | Hari et al. |
| 2016/0277291 A1* | 9/2016 | Lakshmikanthan .. H04L 45/507 |
| 2016/0308793 A1* | 10/2016 | Levy-Abegnoli ....... H04L 45/16 |
| 2017/0012880 A1* | 1/2017 | Yang .................. H04L 12/6418 |
| 2017/0078188 A1* | 3/2017 | Allan ................. H04L 12/4633 |
| 2017/0093612 A1* | 3/2017 | Singh .................... H04L 12/18 |
| 2017/0093689 A1* | 3/2017 | Manur ................... H04L 12/18 |

OTHER PUBLICATIONS

U.S. Appl. No. 14/493,150, Non-Final Office Action, dated Jan. 23, 2015, 5 pages.
U.S. Appl. No. 14/493,150, Notice of Allowance, dated Apr. 15, 2015, 6 pages.
U.S. Appl. No. 14/800,279, Non-Final Office Action, dated Oct. 26, 2015, 6 pages.
Aggarwal, et al. "BGP MPLS Based Ethernet VPN, draft-raggarwa-sajassi-l2vpn-evpn-04.txt", Internet Engineering Task Force (IETF), Network Working Group, Internet-Draft, Sep. 12, 2011, 43 pages.
Allan, et al., "Shortest Path Bridging, MAC Mode Support over EVPN, draft-ietf-bess-spbm-evpn-02," Internet Engineering Task Force (IETF), Bess Working Group, Internet-Draft, Oct. 2015, 11 pages.
Dalal, et al., "Reverse Path Forwarding of Broadcast Packets," Communications of the ACM, Dec. 1978, vol. 21, No. 12, pp. 1040-1048.
Farkas, et al., "IS-IS Path Computation and Reservation, draft-ietf-isis-per-02," Internet Engineering Task Force (IETF), IS-IS for IP Internets, Internet-Draft, Setpember 18, 2015, 32 pages.
Filsfils, et al., "Interconnecting Millions of Endpoints With Segment Routing, draft-filsfils-spring-large-scale-interconnect-00," Internet Engineering Task Force (IETF), IETF Trust, Network Working Group, Internet-Draft, Jul. 19, 2015, 10 pages.
Filsfils, et al., "Segment Routing with Mpls data plane, draft-ietf-spring-segment-routing-mpls-01," Network Working Group, Internet-Draft, May 29, 2015, 14 pages.
Filsfils, et al., "Segment Routing with Mpls data plane, draft-ietf-spring-segment-routing-mpls-02," Network Working Group, Internet-Draft, Oct. 17, 2015, 14 pages.
IEEE P802.1aq/D4.6, Draft Standard for Local and Metropolitan Area Networks—"Media Access Control (MAC) Bridges and Virtual Bridged Local Area Networks-Amendment XX: Shortest Path Bridging", Feb. 10, 2012, 363 pages.
IEEE Std 802.1aq-2012: "IEEE Standard for Local and Metropolitan Area Networks—Media Access Control (MAC) Bridges and Virtual Bridged Local Area Networks—Amendment 20: Shortest Path Bridging," IEEE Computer Society, Jun. 29, 2012, 340 pages.
IEEE Std 802.1Qca/D2.1: "Draft Standard for Local and Metropolitan Area Networks—Bridges and Bridged Networks—Amendment: Path Control and Reservation," IEEE Computer Society, Jun. 23, 2015, 114 pages.
Kini, et al., "Entropy labels for source routed stacked tunnels, draft-ieff-mpls-spring-entropy-label-00," Internet Engineering Task Force (IETF), Network Working Group, Internet-Draft, Mar. 5, 2015, 12 pages.
RFC 3031: Rosen, et al., "Multiprotocol Label Switching Architecture," The Internet Society, Network Working Group, Request for Comments: 3031, Jan. 2001, 61 pages.
RFC 3353: Ooms, et al., "Overview of IP Multicast in a Multi-Protocol Label Switching (MPLS) Environment," The Internet Society, Network Working Group, Request for Comments: 3353, Aug. 2002, 30 pages.
RFC 3813: Srinivasan, et al., "Multiprotocol Label Switching (MPLS) Label Switching Router (LSR) Management Information Base (MIB)," The Internet Society, Network Working Group, Request for Comments: 3813, Jun. 2004, 60 pages.
RFC 4364: Rosen, et al., "BGP/MPLS IP Virtual Private Networks (VPNs)", The Internet Society, Network Working Group, Request for Comments: 4364, Feb. 2006, 47 pages.
RFC 5015: Handley, et al., "Bidirectional Protocol Independent Multicast (BIDIR-PIM)," Network Working Group, Request for Comments: 5015, Oct. 2007, 43 pages.
RFC 5036: Andersson, et al., "LDP Specification," Network Working Group, Request for Comments: 5036, Oct. 2007, 135 pages.
RFC 6329: Fedyk, et al., "IS-IS Extensions Supporting IEEE 802.1aq Shortest Path Bridging," Internet Engineering Task Force (IETF), Request for Comments: 6329, Apr. 2012, 38 pages.
RFC 6388: Wijnands, et al. "Label Distribution Protocol Extensions for Point-to-Multipoint and Multipoint-to-Multipoint Label Switched Paths," Internet Engineering Task Force (IETF), Request for Comments: 6388, Nov. 2011, 39 pages.
RFC 6514: Aggarwal, et al., "Bgp Encodings and Procedures for Multicast in MPLS/BGP IP VPNs," Internet Engineering Task Force (IETF), Request for Comments: 6514, IETF Trust, Feb. 2012, 59 pages.

(56) References Cited

OTHER PUBLICATIONS

RFC 6826: Wijnands, et al., "Multipoint LDP In-Band Signaling for Point-to-Multipoint and Multipoint-to-Multipoint Label Switched Paths," Internet Engineering Task Force (IETF), Request for Comments: 6826, Jan. 2013, 12 pages.

RFC 7734: Allan, et al., "Support for Shortest Path Bridging MAC Mode over Ethernet VPN (EVPN)," Internet Engineering Task Force (IETF), Request for Comments: 7734, Ietf Trust, Jan. 2016, 11 pages.

Sajassi, et al., "PBB E-VPN, draft-sajassi-l2vpn-pbb-evpn-03.K" Internet Engineering Task Force (IETF), Network Working Group, Internet-Draft, Oct. 28, 2011, 25 pages.

U.S. Appl. No. 14/800,279, Notice of Allowance, dated Apr. 12, 2016, 8 pages.

Bhaskar, et al., "Bootstrap Router (BSR) Mechanism for Protocol Independent Multicast (PIM); rfc5059.txt," 5. JCT-VC Meeting; 96. MPEG Meeting; Mar. 16, 2011-Mar. 23, 2011; Geneva; (Joint Collaboartive Team on Video Coding of ISO/IEC JTC1/SC29/WG11 and ITU-T SG.16); URL: http://wftp3.itu.int/av-arch/jcivc-site, Internet Engineering Task Force, IETF, CH, Jan. 1, 2008 (Jan. 1, 2008), XP015055131, ISSN: 0000-0003, Complete chapter "1. Introduction"; p. 3-p. 8.

Cheng D., et al., "IGP Multicast Architecture," draft-yong-pim-igp-multicast-arch-01, IETF, Mar. 9, 2015, pp. 1-15.

Filsfils C., et al,"Segment Routing Architecture," draft-ieff-spring-segment-routing-07.txt, IETF, ISOC, Dec. 15, 2015, pp. 1-24.

Hao W., et al., "IGP Multicast Architecture," draft-yong-rtgwg-igp-multicast-arch-01.txt, IETF, ISOC, Nov. 2014, pp. 1-14.

Li et al.,"Merging Source and Shared Trees Multicast in MPLS Networks," PDCAT, Seventh International Conference, Dec. 1, 2006, pp. 23-28.

Previdi S., et al.,"Spring Problem Statement and Requirements," draft-ietf-spring-problem-statement-07.txt, IETF, ISOC, Mar. 1, 2016, pp. 1-18.

Boudani A., et al., "An Effective Solution for Multicast Scalability: The MPLS Multicast Tree (MMT)—draft-boudani-mpls-multicast-tree-06.txt," Internet Draft, Oct. 2004, 21 pages.

Rabadan J., et al., "Usage and applicability of BGP MPLS based Ethernet VPN—draft-ieff-bess-evpn-usage-01.bd," Internet Engineering Task Force (IETF), Internet Society, Jul. 4, 2015, 30 pages.

Non-Final Office Action from U.S. Appl. No. 14/850,787, dated May 3, 2017, 50 pages.

\* cited by examiner

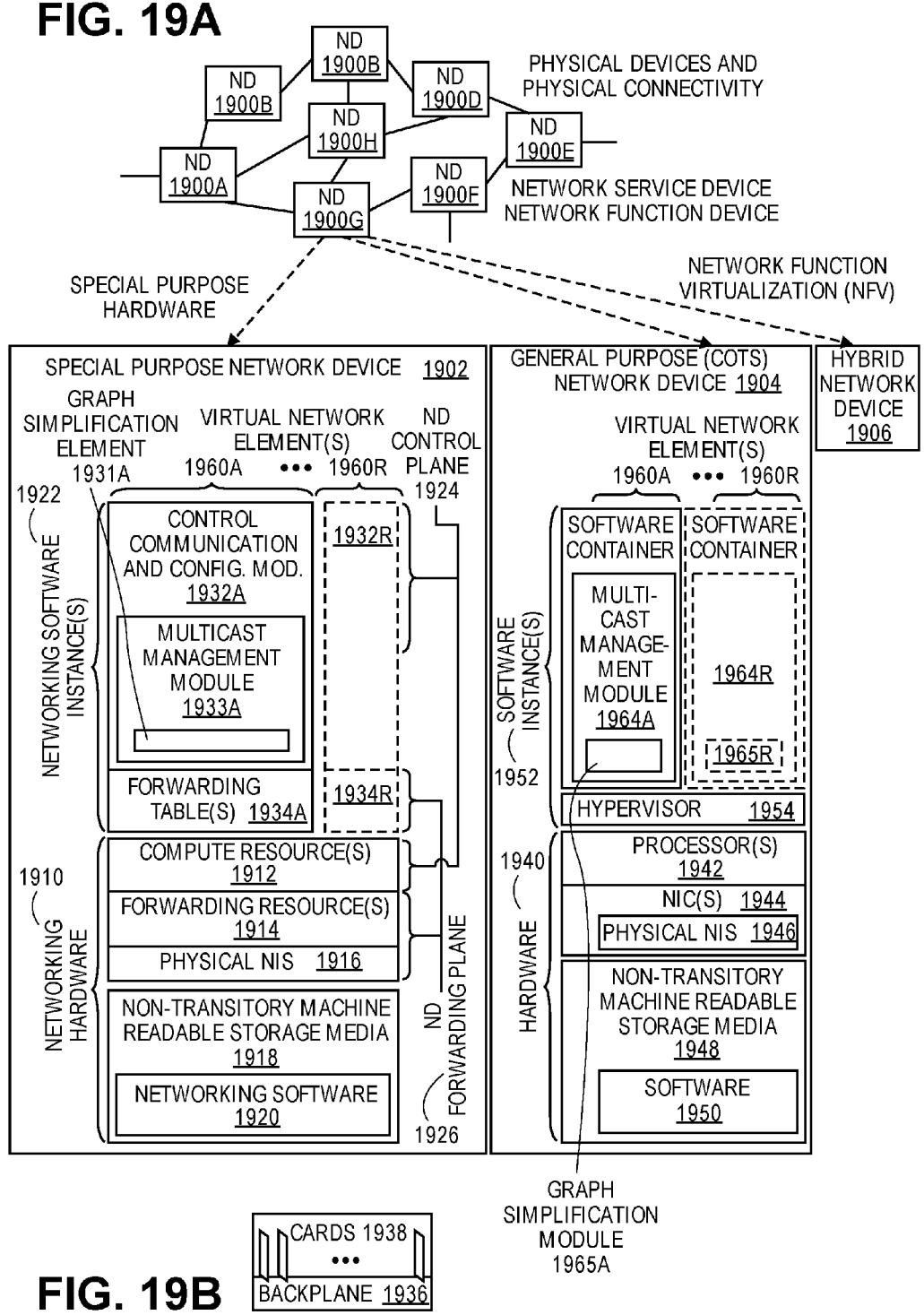

GRAPH CONSTRUCTION FOR COMPUTED SPRING MULTICAST

CROSS-REFERENCE TO RELATED APPLICATIONS

This application claims the benefit of U.S. Provisional Application No. 62/276,739, filed Jan. 8, 2016, which is hereby incorporated by reference.

FIELD

Embodiments of the invention relate to the field of multicast routing. In particular, the embodiments relate to a process for improving the efficiency of multicast routing by reducing the complexity of the graph (topology) of the network for generating "near" minimum cost shortest path trees for use in multicast routing.

BACKGROUND

Numerous techniques and protocols exist for configuring networks to handle multicast traffic. For Internet Protocol (IP) and/or multiprotocol label switching (MPLS) implementations the existing solutions for multicast are based on multicast label distribution protocol (mLDP) or protocol independent multicast (PIM). These are all techniques that depend on a unicast shortest path first (SPF) computation followed by handshaking between peers to sort out a loop free multicast distribution tree (MDT) for each multicast source. At the same time numerous protocols exist that provide for unicast tunneling, and some (such as label based architectures like source packet in routing (SPRING) or MPLS-LDP) implement a full mesh of unicast tunnels as an artifact for normal operation.

Shortest path bridging (SPB) is a protocol related to computer networking for the configuration of computer networks that enables multipath routing. In one embodiment, the protocol is specified by the Institute of Electrical and Electronics Engineers (IEEE) 802.1aq standard. This protocol replaces prior standards such as spanning tree protocols. SPB enables all paths in the computing network to be active with multiple equal costs paths being utilized through load sharing and similar technologies. The standard enables the implementation of logical Ethernet networks in Ethernet infrastructures using a link state protocol to advertise the topology and logical network memberships of the nodes in the network. SPB implements large scale multicast as part of implementing virtualized broadcast domains. A key distinguishing feature of the SPB standard is that the MDTs are computed from the information in the routing system's link state database via an all-pairs-shortest-path algorithm, which minimizes the amount of control messaging to converge multicast.

SPRING is an exemplary profile of the use of MPLS technology whereby global identifiers are used in the form of a global label assigned per label switched route (LSR) used for forwarding to that LSR. A full mesh of unicast tunnels is constructed via every node in the network computing the shortest path to every other node and installing the associated global labels accordingly. In the case of SPRING, this also allows explicit paths to be set up via the application of label stacks at the network ingress. Encompassed with this approach is the concept of a strict (every hop specified) or loose (some waypoints specified) route dependent on how exhaustively the ingress applied label stack specifies the path.

Proposals have been made to use global identifiers in the dataplane combined with the IEEE 802.1aq technique of advertising multicast registrations in the interior gateway protocol (IGP) and replicating the "all pairs shortest path" approach of IEEE 802.1aq to compute MDTs without the additional handshaking. Such an approach would inherit a lot of desirable properties embodied in the IEEE 802.1aq approach, primarily in the simplification of the amount of control plane exchange required to converge the network.

However, the configuration of flat multicast trees in such networks using MPLS, SPB, SPRING and similar technologies can generate a significant amount of state, in particular in association with source specific tree implementation of multicast groups. To implement a given multicast group it is necessary to install state to implement an MDT per source. Less optimal solutions exist such as spanning trees or shared trees, but a tree per source per group provides for efficient, minimal latency multicast delivery, hence is desirable.

Previous art in the field suggests that it may be possible with a computed tree to utilize unicast tunneling in a SPRING or similar network to minimize the amount of state in the forwarding plane. However, simply applying the IEEE 802.1aq algorithms that compute a common "template" solution for all MDTs from a given source to the tunneled approach in a network that also implements equal cost multipath (ECMP) may result in multiple copies of a packet traversing a given interface. An algorithm that generates a minimum cost shortest path tree for each group served by each source would have the correct properties, but would be computationally prohibitive. An algorithm that generates MDTs that avoids packet duplication in an ECMP network in a timely fashion would be desirable, as well as the benefit of an increase in bandwidth efficiency.

SUMMARY

In one embodiment, a method is implemented by a network device to simplify a topology graph of a network and to generate a multicast distribution tree. The method reduces the complexity of the topology graph such that a computational complexity of generating the multicast distribution tree is reduced. The method computes a shortest path to all nodes of the topology graph rooted at a source node S, determines a metric for each adjacency on each shortest path of the topology graph for multicast group G, and constructs an (S, G) graph with only source node S, leaves and candidate replication points. The method further prunes the (S, G) graph using a first set of pruning processes to attempt to fully resolve the multicast distribution tree, where full resolution can be determined, and the first set of pruning processes if successful are known to produce a minimum cost tree.

In another embodiment, a network device is configured to execute a method to simplify a topology graph of a network and to generate a multicast distribution tree. The method reduces the complexity of the topology graph such that a computational complexity of generating the multicast distribution tree is reduced. The network device includes a non-transitory machine readable storage medium having stored therein a graph simplification element, and a processor coupled to the non-transitory machine readable storage medium. The processor is configured to execute the graph simplification element. The graph simplification element is configured to compute a shortest path to all nodes of the topology graph rooted at a source node S, to determine a metric for each adjacency on each shortest path of the topology graph for multicast group G, to construct an (S, G)

graph with only source node S, leaves and candidate replication points, and to prune the (S, G) graph using a first set of pruning processes to attempt to fully resolve the multicast distribution tree, where full resolution can be determined, and the first set of pruning processes if successful are known to produce a minimum cost tree.

In a further embodiment, a computing device is configured to execute a plurality of virtual machines. The plurality of virtual machines implement network function virtualization (NFV). The computing device is in communication with a network device. A virtual machine from the plurality of virtual machines is configured to execute a method to simplify a topology graph of a network and to generate a multicast distribution tree. The method reduces the complexity of the topology graph such that a computational complexity of generating the multicast distribution tree is reduced. The network device includes a non-transitory machine readable storage medium having stored therein a graph simplification element, and a processor coupled to the non-transitory machine readable storage medium. The processor is configured to execute the virtual machine. The virtual machine is configured to execute the graph simplification element. The graph simplification element is configured to compute a shortest path to all nodes of the topology graph rooted at a source node S, to determine a metric for each adjacency on each shortest path of the topology graph for multicast group G, to construct an (S, G) graph with only source node S, leaves and candidate replication points, and to prune the (S, G) graph using a first set of pruning processes to attempt to fully resolve the multicast distribution tree, where full resolution can be determined, and the first set of pruning processes if successful are known to produce a minimum cost tree.

In one embodiment, a control plane device is configured to implement a control plane of a software defined networking (SDN) network including a network device. The control plane device is configured to execute a method to simplify a topology graph of a network and to generate a multicast distribution tree. The method reduces the complexity of the topology graph such that a computational complexity of generating the multicast distribution tree is reduced. The control plane device includes a non-transitory machine readable storage medium having stored therein a graph simplification element, and a processor coupled to the non-transitory machine readable storage medium. The processor is configured to execute the graph simplification element. The graph simplification element is configured to compute a shortest path to all nodes of the topology graph rooted at a source node S, to determine a metric for each adjacency on each shortest path of the topology graph for a multicast group G, to construct an (S, G) graph with only source node S, leaves and candidate replication points, and to prune the (S, G) graph using a first set of pruning processes to attempt to fully resolve the multicast distribution tree, where full resolution can be determined, and the first set of pruning processes if successful are known to produce a minimum cost tree.

BRIEF DESCRIPTION OF THE DRAWINGS

The invention may best be understood by referring to the following description and accompanying drawings that are used to illustrate embodiments of the invention. In the drawings:

FIG. 19A illustrates connectivity between network devices (NDs) within an exemplary network, as well as three exemplary implementations of the NDs, according to some embodiments of the invention.

FIG. 19B illustrates an exemplary way to implement a special-purpose network device according to some embodiments of the invention.

DESCRIPTION OF EMBODIMENTS

Figure 1:
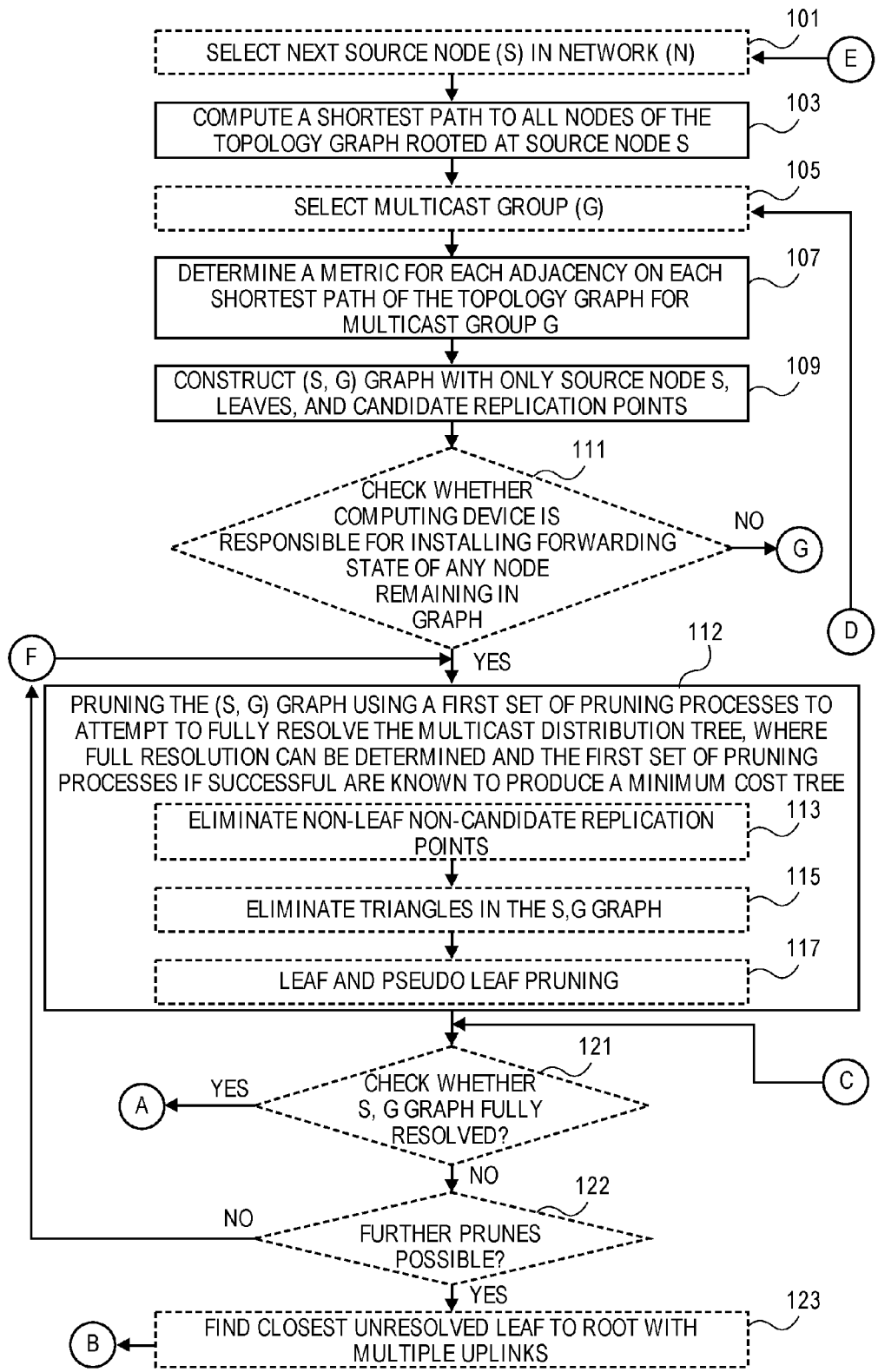
FIG. 1 is a flowchart of one embodiment of the process for simplifying the network topology graph.
Figure 1:
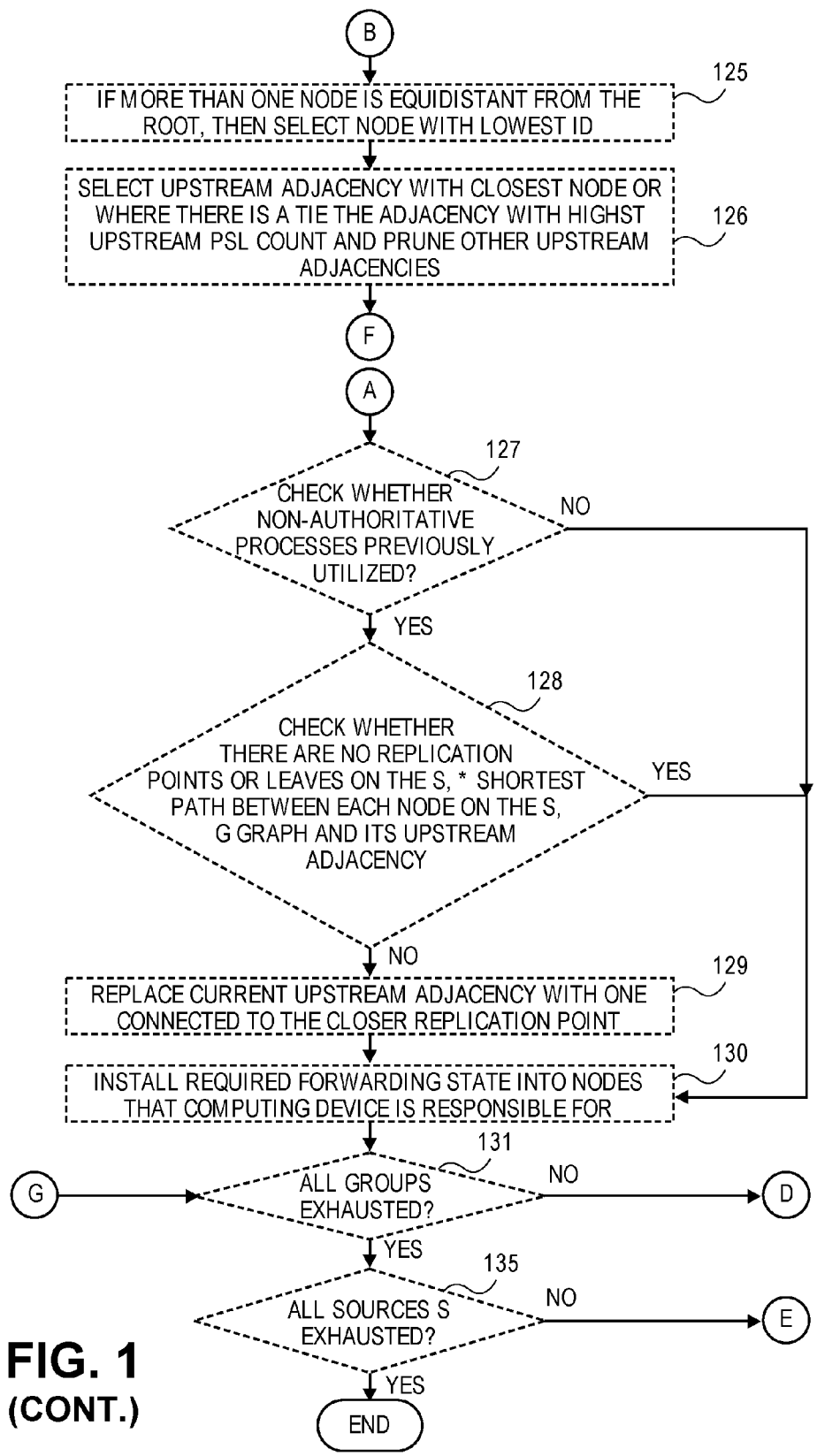

The following description describes methods and apparatus for reducing the computational complexity of shortest path tree computation in the computation of near minimum cost multicast distribution trees. This is implemented as a hybrid of replication points and unicast tunnels in a SPRING or similar architecture although it is also possible to envision an implementation for a "flat" network. The embodiments provide a process and system whereby a given shortest path tree from a root to a set of destinations overlaid upon the network topology is progressively simplified. The process performs a set of prescribed graph pruning operations to simplify the topology. The pruning process iterates until the shortest path tree is determined to be minimum cost and acyclic, or until no further pruning of the network topology graph is possible by the proscribed set of operations, in which case additional pruning rules are applied that will result in a near minimum cost tree. The pruning process involves the identification of graph structures or arrangements that can be simplified by removal of nodes and/or links in the graphs in the context of a multicast distribution tree (MDT) where packets from a root node are to be distributed to a set of leaves.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As used herein a potentially served leaf (PSL) count is the number of leaves of a specific MDT that could possibly be served by a given link at the current point in the tree construction process. A PSL list is simply the list of leaves potentially served by given link. A candidate replication point refers to a node in a network topology graph that has an asymmetrical arrangement of non-zero "potentially served leaf" (PSL) counts on its upstream and downstream adjacencies (note that adjacencies may exist that are not on the shortest path, and are not considered in making this determination). A candidate replication point is not guaranteed to be a replication point in a fully resolved MDT, hence the term "candidate." It is a designation to describe a node which may or may not be required to replicate packets in the MDT under construction, and that role has not yet been determined by the tree construction process. The root can be a candidate replication point and any leaf can be a candidate replication point. The term downstream refers to the direction of the root to some subset of leaves in the MDT, or to express a relative direction in terms of the root such as "downstream" of "n" which is on the shortest path at some point further than "n" from the root. Upstream refers to the direction of a leaf towards the root (or to express a relative direction). A pinned path is a path that is unique from a leaf to some point in the network, which could be the root of the MDT or an intermediate point. A pseudo-leaf is a node that is the closest point to the root where a pinned path to a leaf terminates.

Overview

The tree construction algorithms specified in IEEE 802.1aq produce a minimum cost shortest path tree, but this is only true in the scenario where every node in the network topology graph is a leaf. The prototype tree used by all per Individual Service Identifier (I-SID) multicast distribution trees MDTs (S,*) is minimum cost, but the individual (S,G) MDTs are not necessarily optimal. In this notation (S, *) is the set of MDTs with a source S reaching all destinations * and (S, G) in this notation identifies a MDT with a source S and group of subscribers G which is some subset of "*". When unicast tunnels are incorporated in an equal cost multi-path (ECMP) network as components of MDT construction, multiple copies of the same multicast packet may transit a link for a given (S,G) MDT produced with basic 802.1aq (S,*) tiebreaking. Thus, these MDTs are not providing an optimal use of the bandwidth in the network and adding complexity to the nodal implementation and would frequently require more overall state in the network than a more optimal MDT schema. An optimal solution would require that the shortest path tree for each MDT uniquely avoid this problem such that each MDT has the property that a replication point or leaf of the MDT does not have another replication point between itself and the replication point sending it traffic. The possibility of deployment of the solution as an interoperable distributed system would also entail an algorithm to permit nodes to independently compute a common result for every MDT. Although the state reduction possibilities of utilizing unicast tunnels as a component of MDT construction is well suited to a software defined networking (SDN) separation of controller and forwarding elements, the algorithm for a distribution is needed to support non-SDN implementations and hybrid implementations.

Any tie breaking algorithm for a faster convergence shortest path tree computation must have the following properties, (1) it must produce an acyclic graph (i.e., a graph with no loops), (2) it must produce a unique solution, and (3) a replication point that serves a leaf cannot have other replication points downstream of it that are also on the set of possible shortest paths to the same leaf, otherwise two copies of a multicast packet will need to be sent on the same link.

The following properties for a tie-breaking for faster convergence in shortest path tree computation would be desirable but are not required. It would be desirable that (4) multicast connectivity in the multicast distribution tree is symmetric between any two points, and that (5) the tree is absolutely minimum cost for (S,G). Of these five properties IEEE 802.1aq achieves 1, 2 and 4. However, the embodiments herein achieve 1, 2 & 3 and the (S,G) trees produced are lower cost than the IEEE 802.1aq (S,*) trees.

Producing a perfectly minimum cost shortest path tree to an arbitrary subset of leaves on a graph is a computationally hard problem. To compute the tree, each node needs to start such an exploration at the root to produce an authoritative answer, which requires each node downstream of the root to explore its subset of the tree and ultimately roll up to decisions.

To reduce the complexity of the construction of the multicast distribution trees, the embodiments provide a process that produces a simplified graph of only the potential components of a given S,G tree. The process performs a series of graph pruning operations to simplify the topology of the S,* tree and personalize it for the individual set of recipients in the group. The graph pruning is repeated until either the tree is fully determined, or no further pruning according to the rules of the algorithm can be performed. Any S,G tree that is fully resolved after the iterative pruning process, where all leaves have a unique shortest path to the root, can be considered to be fully resolved as it will have the correct properties.

For any S,G that has not been fully resolved after the iterative process completes, where all leaves have a unique shortest path to the root, additional pruning operations known to have a high probability of producing a tree of the desired properties can be applied, but it may be necessary to check the result, and possibly execute corrections to preserve the properties that are sought including the property that no leaf or replication point exists on the set of shortest paths between a leaf or replication point and the node it receives traffic from.

Empirical testing of the process set forth herein shows that the basic pruning produces a tree that is a lowest cost and fully resolved for approximately 97% of leaves in the topology. The more dense the tree, the higher the percentage of leaves that have a lowest cost. Of the trees known to potentially "not be clean" approximately 0.03% of them required correction and even with correction these trees were not guaranteed to be minimum cost, simply ECMP "friendly." Correction of this set of trees took a significantly less computation that an authoritative search of even the <1% not resolved by simple pruning. Testing run a basic computing device that simulated small networks (16-20 nodes) performed about 200000 tree computations/sec. Thus, network devices implementing the processes of the embodiments have more than sufficient compute and resources to implement the processes.

In some embodiments, additional information is used in the pruning process for selecting shortest path trees. To implement the processes of the embodiments, there are metrics associated with each adjacency that are utilized for pruning that are extracted from the routing database. These metrics are the potential served leaf (PSL) count, and the potential served leaf list.

The PSL count for an adjacency is the number of leaves in G that are on the shortest path from S at a given point in the pruning process. The PSL list for an adjacency is the list of actual leaves enumerated by the PSL count. These metrics can be determined by traversing the shortest path (including all multi-path variations) back from each leaf towards the root, and recording the adjacencies traversed in the process. The PSL count and PSL list are kept up to date during the pruning process and act as a continuous input into the pruning decisions.

The pruning process can be expressed in pseudocode as follows:

```
For each source node (S) in network (N):
   Compute the shortest path without tie breaking rooted on S
   For each G for which S is a source:
      Determine the PSL metrics for each adjacency on the shortest path
      Construct the S,G graph which only includes the root, the leaves and any
                candidate replication points (tunnels will be employed as the
                interconnect)
      If the computing node does not appear in the S,G graph, then terminate
                processing of this S,G - (These computing nodes will not have to
                install state for this tree)
```

(There are three types of pruning performed on the S, G graph, which can be performed in any order and can be repeated until no more prunes are possible)

```
         Else
            Do
               Eliminate non-leaf non-candidate replication points
               Eliminate triangles
               Leaf and Pseudo Leaf pruning
            Until no further prunes are possible continue Do loop
```

Note that any candidate replication nodes that lose their status (reverting to simply transit as a result of pruning) are eliminated from the S, G graph

```
            If S,G fully resolved (all leaves have a unique path to the root in the pruned
graph) install state, then proceed to next G for which S is a source
               Else
                  while current S,G trees not fully resolved
                     Find the closest node to the root with multiple uplinks, if more than one
                           select the one with the lowest node ID
                     Of the set of uplinks, select the one where the next uplink has the highest
                           PSL count (again if a tie choose the one from the tied set
                           with the lowest node ID). Prune the other uplinks.
                     Repeat the normal pruning
                  Endwhile
                  check that there are no replication points or leaves on the S,* shortest path
                        between each node on the S,G graph and it's upstream adjacency
                        (there should be only one at this point), if there is, replace the
                        current upstream adjacency with one connected to the closer
                        replication point or leaf (in a further embodiment, those leaves
                        that had a unique path to the root after normal pruning do not
                        need to be checked)
            Endif
         Endif
      Next G
   Next S
End Pseudocode
```

It is worth noting that once all possible prunes have been performed and the tree is still unresolved, the step taken in pruning can be considered exemplary as it empirically generated good results, and other non-authoritative prunes could be considered.

FIG. 1 is a flowchart of one embodiment of the process for simplifying the network topology graph. This flowchart is equivalent to the pseudocode representation set forth above. In one embodiment, the process begins in response to a change in topology, group memberships or similar event that requires that the MDTs be computed or recomputed. The process can encompass computation of all MDTs for all sources (S) and all groups (G) or any subset thereof. The process can iterate through the sources and groups to be processed to generate the associated MDTs. The process can begin with selecting a source (S) in the network (N) to be processed (Block 101). The shortest path is then calculated to all nodes of the network N to generate a tree rooted at S where no tie-breaking is performed in the computation (Block 103) such that all multi-path options are preserved in the generation of the initial graph.

The process continues by selecting a multicast group (G) (Block 105). A determination of the PSL metrics (count and list) for each adjacency on the shortest paths (Block 107) is performed. The (S, G) graph with only root, leaves and candidate replication points is constructed (Block 109). At this point an implementation check is then made whether any nodes the computing device is responsible for determining forwarding state for remains in the graph (Block 111). If those nodes are not in this graph, then the computing device will not need to install any state for this MDT and the process can continue on to check whether additional groups (Block 131) and sources (Block 135) remain to be processed in which case, then the next group or source is selected, respectively.

If the computing device expects to install state for the MDT, then the process begins to prune the graph where the following pruning steps can be performed in any order (Block 112). The sequence of the flowchart is provided by way of example and not by way of limitation. The pruning can include eliminating non-leaf non-candidate replication nodes (Block 113). Triangles can also be eliminated in the (S, G) graph (Block 115). Further leaf and pseudo leaf pruning can be carried out (Block 117). Examples of each of these pruning techniques is provided herein below.

A check can be made after each iteration of pruning as to whether the (S, G) graph has been resolved (Block 121) via testing that all leaves have a unique path to the root. If the (S, G) graph has been resolved then the process can determine the required state to be installed (Block 130) and then continue to determine whether additional groups (Block 131) and/or sources (Block 135) remain to be processed in which case, then the next group or source is selected, respectively. Where not fully resolved the (S, G) MDT a check is made whether further pruning of the MDT is possible (Block 122). If further pruning is possible then the process continues with another iteration of pruning processes (Block 113). If no further pruning is possible, then the MDT is further processed by performing a prune that will not authoritatively generate a minimum cost tree. An exemplar of which would be finding the closest node to the root where the leaf has multiple upstream adjacencies (Block 123). Where there is more than one node equidistant from the root, select the node with the lowest node ID (Block 125). Then select the upstream adjacency with the closest node as the best, and if there is a tie then select the adjacency with the node that has the highest upstream PSL count. If there is a tie, select the node with the lowest node ID from the set of nodes with the highest upstream PSL count. Prune all other upstream adjacencies (Block 126). Once this is complete the regular pruning operations (triangle elimination, non-candidate replication point elimination, and leaf/pseudo leaf pruning) are repeated until the MDT is either fully resolved, or no further prunes can be performed, in which case Block 123 followed by pruning again is repeated until the MDT is fully resolved.

Any MDT that included Blocks 123-126 or any non-authoritative process in the determination process needs to be verified as correct. A check is made when a graph has resolved as to whether non-authoritative processes where previously utilized (Block 127). If no non-authoritative processes where utilized then the process can proceed to install state as required (Block 130) However, if non-authoritative processes where utilized, then a check is made whether there are no replication points or leaves on the S, * shortest path between each node on the S, G graph and its upstream adjacency (Block 128). If no such replication point is found, that MDT is considered complete and state can be installed as required (Block 130). Otherwise the graph is modified such that a new adjacency is established for each node that has a closer replication point or leaf (Block 129) to that closer point and to delete the previous upstream adjacency. When the check/verification of the MDT is complete, any state to be installed can be determined (Block 130).

This process continues on until all of the MDTs are resolved. The iterative process can be implemented in a distributed manner by each of the nodes in the network. When each of the simplified graphs are computed, the requisite state to be installed by the computing node can be determined and scheduled for installation. The algorithm itself can be parallelized at the granularity of S,G.

The process involves a set of pruning or graph shaping techniques that are discussed herein below with reference to FIGS. 2-15. As mentioned above, these processes and techniques can be employed largely in any order and are not presented in any order of significance herein.

Figure 2:
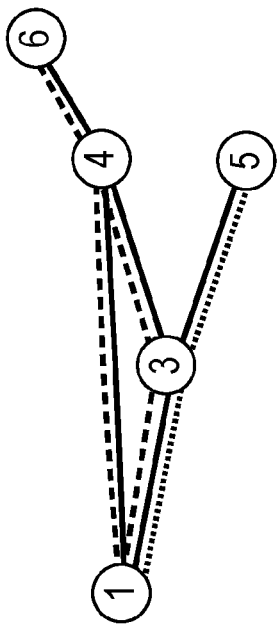
FIG. 2 is a diagram of one embodiment of the process for eliminating non-leaf non candidate replication points.
Figure 2:
Figure 2:
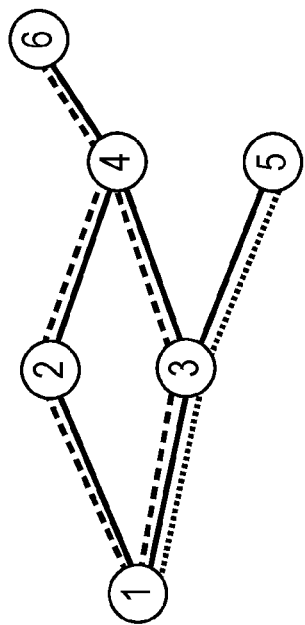

FIG. 2 is a diagram of one embodiment of the process for eliminating non-leaf non replication points to produce a near-minimum cost MDT. An example network topology is shown in a before and after presentation. On the left-hand side, the diagram shows the network topology graph before the non-leaf non-candidate replication point elimination process. In the illustrated example network topology there are six nodes. There are four non-leafs in this topology graph, nodes 1-4. This process identifies non-leaf and non-candidate replication points. Non-candidate replication points are nodes that are determined to not be responsible for replicating or terminating multicast traffic for the particular MDT. In other words, there is no branching of the tree at these nodes. In this example, node 2 is a non-leaf non-candidate replication node. As such, this process removes these types of nodes from the topology graph and replaces them with links to simplify the topology graph. These nodes will not need to install state for this MDT. In a sense traversing these nodes is inherent to selecting a path involving replication points upstream or downstream of these non-candidate nodes. For path computations therefore, these nodes can be ignored as part of the simplification that is illustrated with the removal of node 2.

Figure 3:
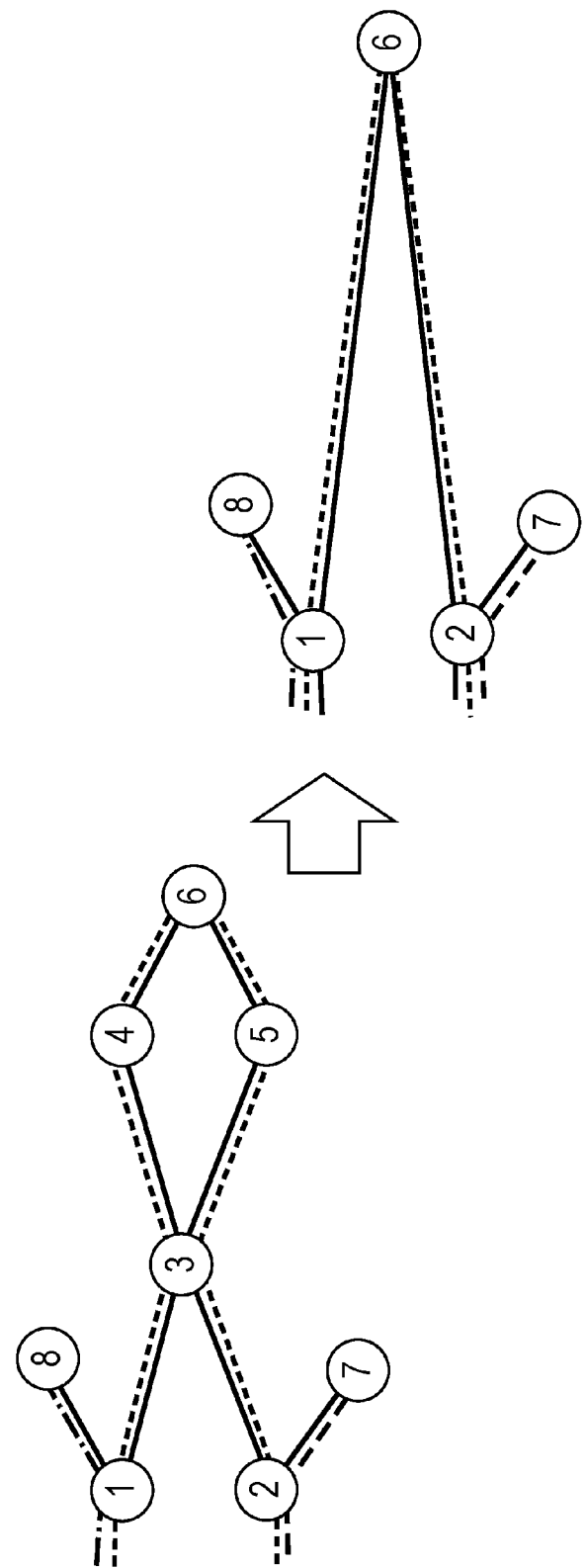
FIG. 3 is a diagram of one embodiment of a process for eliminating non-leaf non-candidate points.

FIG. 3 is a diagram of one embodiment of a process for eliminating non-leaf non-candidate points. The same process is involved as described above. FIG. 3 provides another scenario to clarify the application and operation of the process. In this example there are three leaves at nodes 6, 7, and 8. Nodes 3, 4 and 5 are non-replication points on the possible routes to node 6. Node 3 is not a candidate replication node since all of the downstream paths lead to the leaf at node 6 there is no need to replicate the received packets since it would be redundant. Thus, nodes 3, 4 and 5 can all be removed from the topology graph as is shown.

Figure 4:
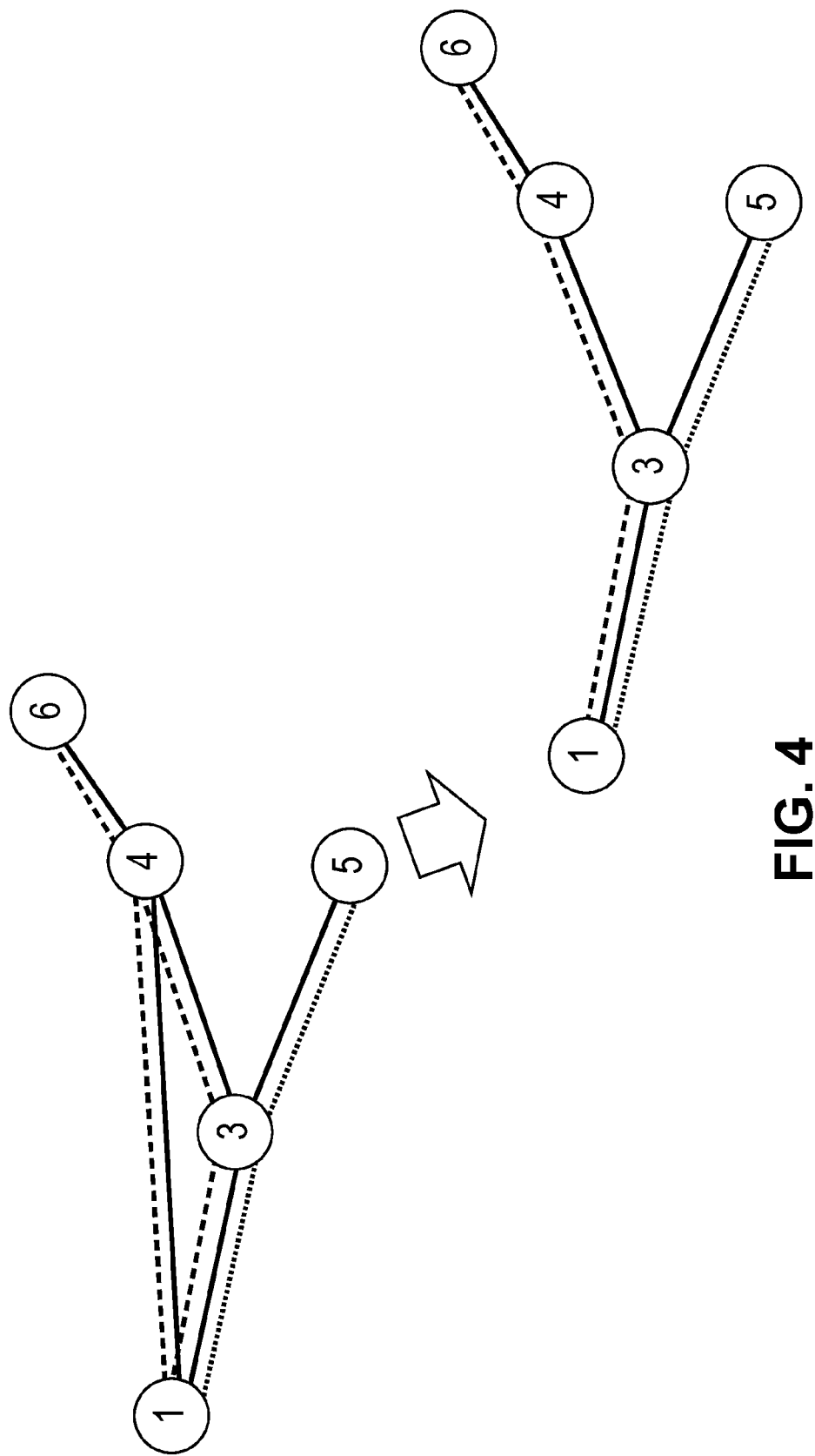
FIG. 4 is a diagram of one embodiment of an example application of a process for removing triangles from the network topology graphs.

FIG. 4 is a diagram of one embodiment of an example application of a process for removing triangles from the network topology graphs. A triangle, as used herein, refers to a scenario where there are two equivalent paths, from the point of view of the candidate replication points. In the triangle structure, one path has no intermediate candidate replication hops while the other path does have candidate replication hops. Where such structures occur, the path with no candidate replication hops can be removed from the network topology graph, because this path does not figure into the determination of the resulting MDT topology while any of the candidate replication points on the unpruned path may or may not figure into the resulting MDT and if it does not the result would be equivalent to the elimination of the other path.

In the illustrated example, there are two leaf nodes 5 and 6. Leading to these leaf nodes there are two paths to reach leaf node 6. The first path 1-4-6 and the second 1-3-4-6. The path 1-4 can be eliminated because from the point of view of the determination of replication points, this path is already represented by the alternate path 1-3-4, since they lead to the same intermediate point. In the example, if the triangle process and non-leaf non-replication point elimination process were applied together then node 4 could be removed after the application of the triangle process.

Figure 5:
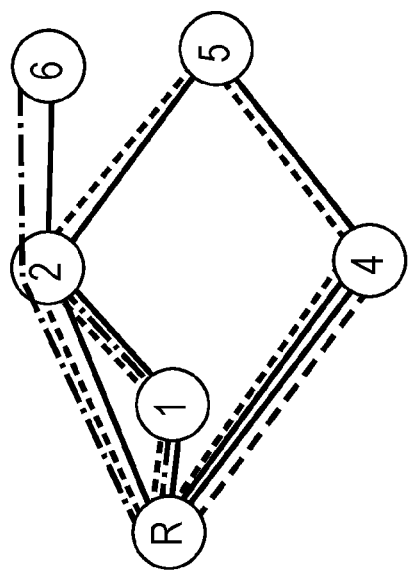
FIG. 5 is a diagram of one embodiment of a leaf and pseudo-leaf pruning process.
Figure 5:
Figure 5:
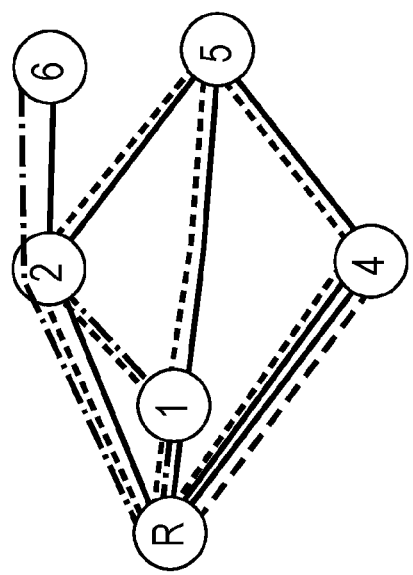

FIG. 5 is a diagram of one embodiment of a leaf and pseudo-leaf pruning process. This process considers the upstream adjacencies of all nodes in the current MDT and prunes any upstream adjacencies where the distance to both a leaf is further than that of the upstream adjacency with the closest leaf or pinned path and the distance to any candidate replication points is further or equal than that of the upstream adjacency with the closest leaf or pinned path.

Where there is more than one adjacency with an equally close leaf or pinned path, and some have closer candidate replication points, the adjacencies without the closer candidate replication points are pruned. Where there is more than one adjacency with an equally close leaf or pinned path and no closer candidate replication points, a means of selecting one is employed, an exemplar being choosing the one with the lowest node ID and pruning the others.

In the example network topology graph there are 3 leaf nodes 4, 5 and 6. In the example, the link 2-6 is pinned since it is the only path to reach node 6. From the point of view of leafs, pseudo-leaves and pinned paths nodes 5, 2 and 4 qualify as being equally close to a replication point but path 1-5 has a larger leaf distance and can be eliminated as shown.

Figure 6:
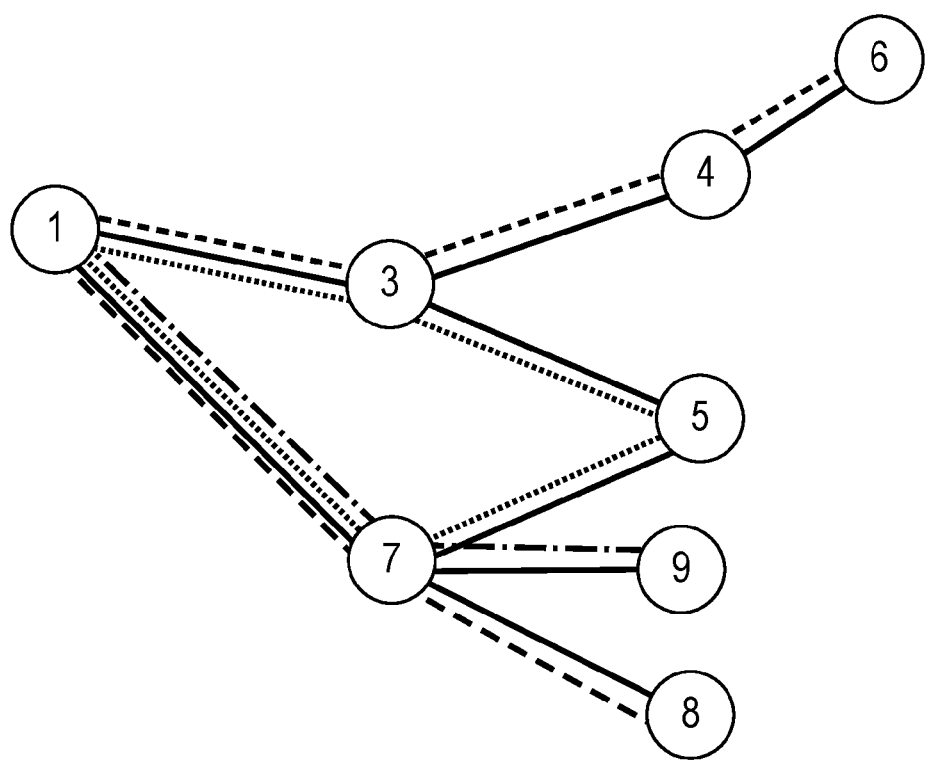
FIG. 6 is a diagram of one embodiment of an example non-authoritative prune process.

FIG. 6 is a diagram of one embodiment of an example non-authoritative prune process. In this example, node 1 is the root and nodes 5, 6, 8 and 9 are leaves. Leaf 5 is the closest (and only) unresolved leaf in the example and has two upstream adjacencies (5-3 and 5-7) that are equidistant. Therefore, the next hops are examined (3-1 and 7-1). Adjacency 7-1 has a PSL count of 3 while adjacency 3-1 has a PSL count of 2, therefore adjacency 5-7 is considered to be superior to adjacency 5-3, which is then pruned.

FIGS. 7-16 are diagrams providing an example application of the process to an example topology graph of a network. Each of FIGS. 7-16 shows a next step in a sequence of the process. However, the sequence provided in this example is by way of example and not limitation. One skilled in the art would understand that many of the steps could be performed in a different order to achieve the same or similar results.

In this process it should be understood that multiple computing devices can be independently performing this computation. However, not all computing devices in the network need to complete the entire computation for all trees deployed in the network. Each computing device can determine if it can 'exit' the process for a certain (S, G) graph computation. A computing device implementing the overall process of the topology graph simplification has numerous opportunities to minimize computation in the context of its own role in the network. The problem can be divided such that each computing device is not required to exhaustively compute every aspect of all (S, G) MDTs in the network. Rather, a given computing device need only compute those it might need to install state for. Thus, the computing device needs to be responsible for a root, replicating node or leaf to be required to install state for an MDT. During the constructions of an S, G graph, a computing device may determine that no node it has responsibility for has any possible role in a given tree and not proceed further with that particular tree.

Figure 7:
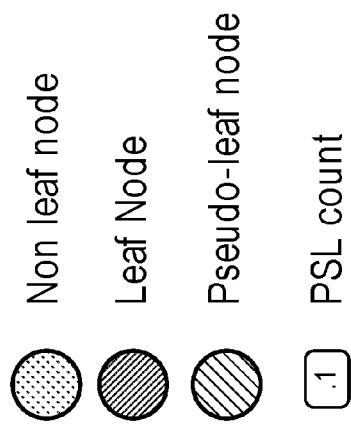
FIG. 7 is a diagram of a network topology graph with a root at node 1 and having four leaves.
Figure 7:
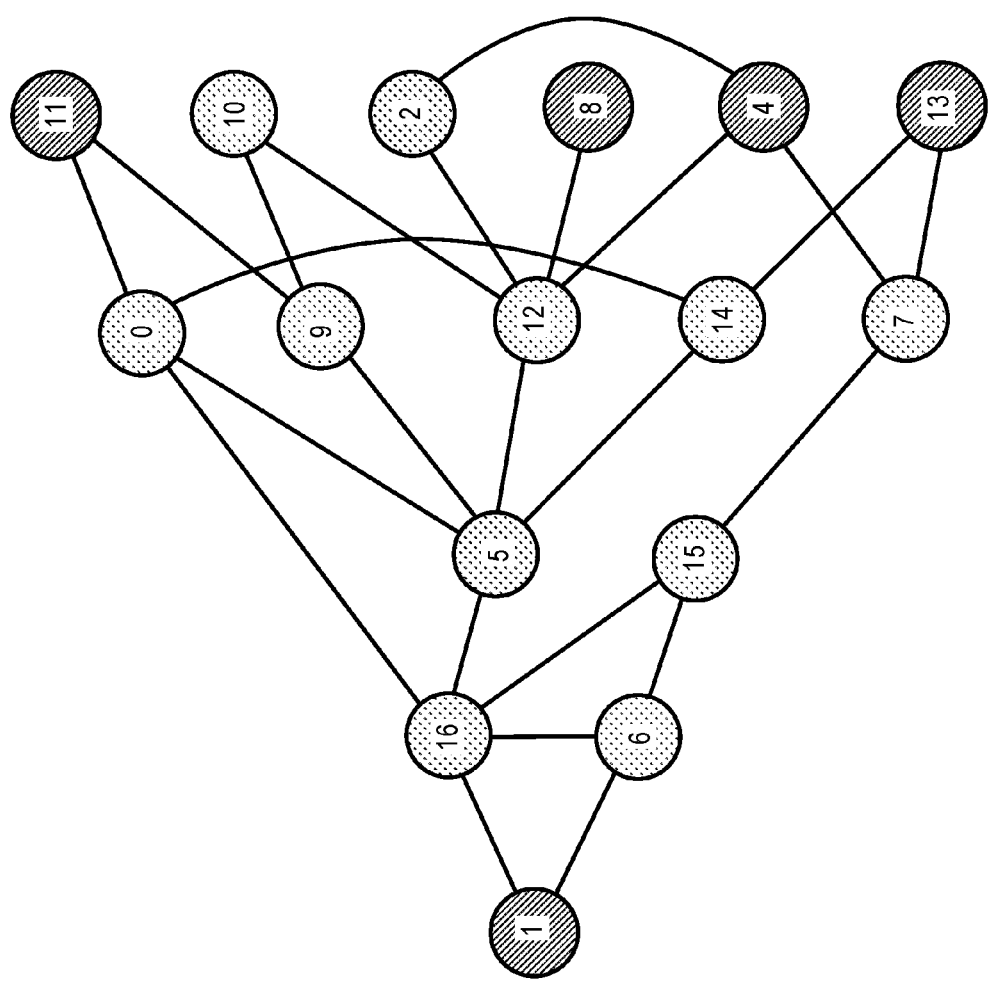
Figure 8:
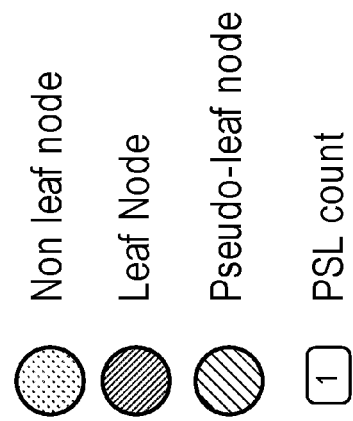
FIG. 8 is a diagram of the network topology with potentially served leaf (PSL) metrics.
Figure 8:
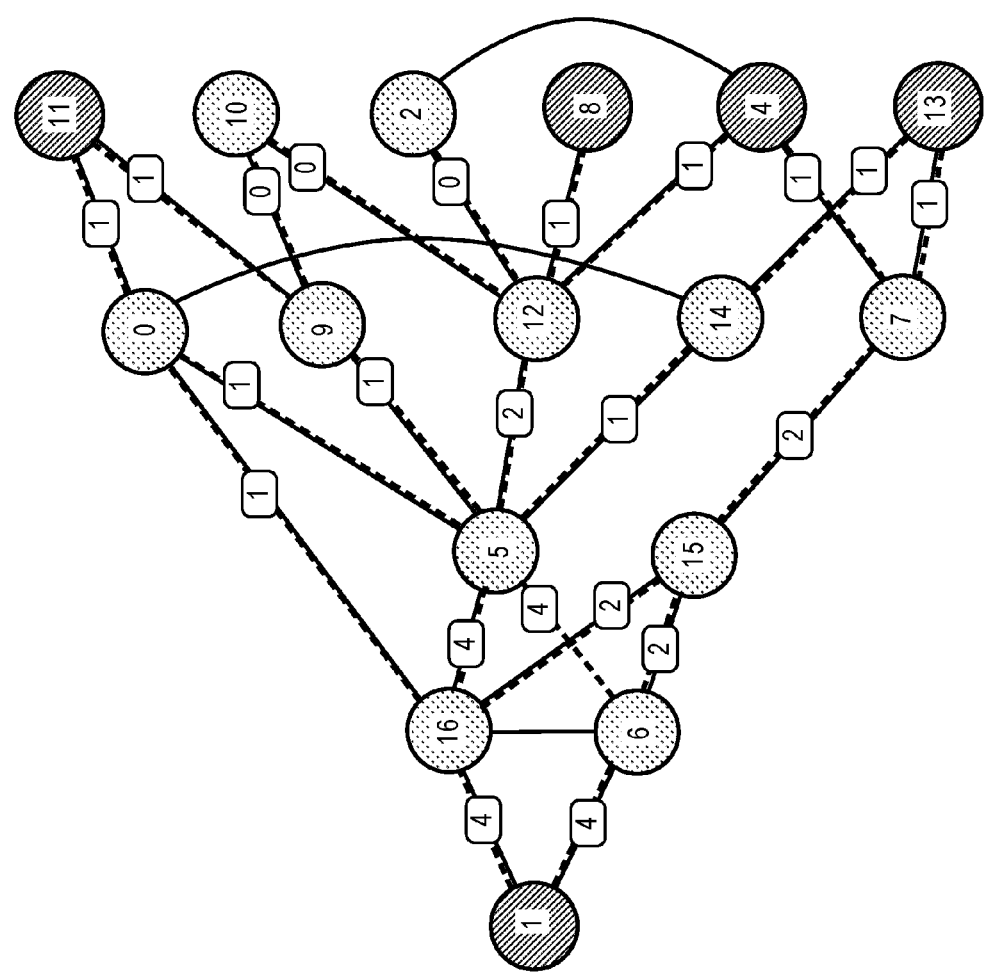

FIG. 7 is a diagram of a network topology graph. An MDT is to be determined with a root at node 1 and having four leaves. The four leaves are nodes 11, 8, 4 and 13. A shortest path is computed from the root to each leaf without any resolution of multiple path options as shown in FIG. 8 and in accordance with the overall process discussed herein. So, for example, node 5 has two possible paths to root 1, 5-16-1 and 5-6-1 respectively and any path to a leaf that transits node 5 will manifest itself in the PSL metrics for both paths. The next step in the process of graph simplification is to compute PSL metrics and/or to find pseudo leaves and pinned paths exposed as a consequence of computing the initial shortest path tree, the result of which is shown in FIG. 8. In this example, it is shown that leaf node 8 has a unique shortest path as far as node 5 so node 5 is a pseudo-leaf in this network and a pinned path is considered to extend from node 8 to node 5. A further step is to identify non-leaf non-candidate replicating nodes. This would be nodes 0, 2, 9, 10, 14, and 15. Thus, these nodes can be removed from the graph and replaced with links. When the computing device determining the MDT performs this computation they can in some embodiments stop further computation of this particular MDT if they are not responsible for generating state for one of the remaining nodes after each pruning step. For example, if the implementation was a distributed routing system, and node 2 was performing this computation, it would have determined that it had been eliminated from the graph at this point and could then skip to the next MDT to be determined.

Figure 9:
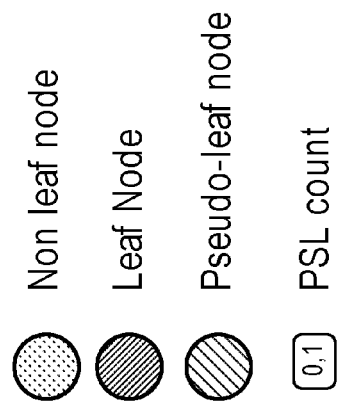
FIG. 9 is a diagram of the network topology graph after the (S, G) graph is simplified by removing non-leaf non-candidate nodes.
Figure 9:
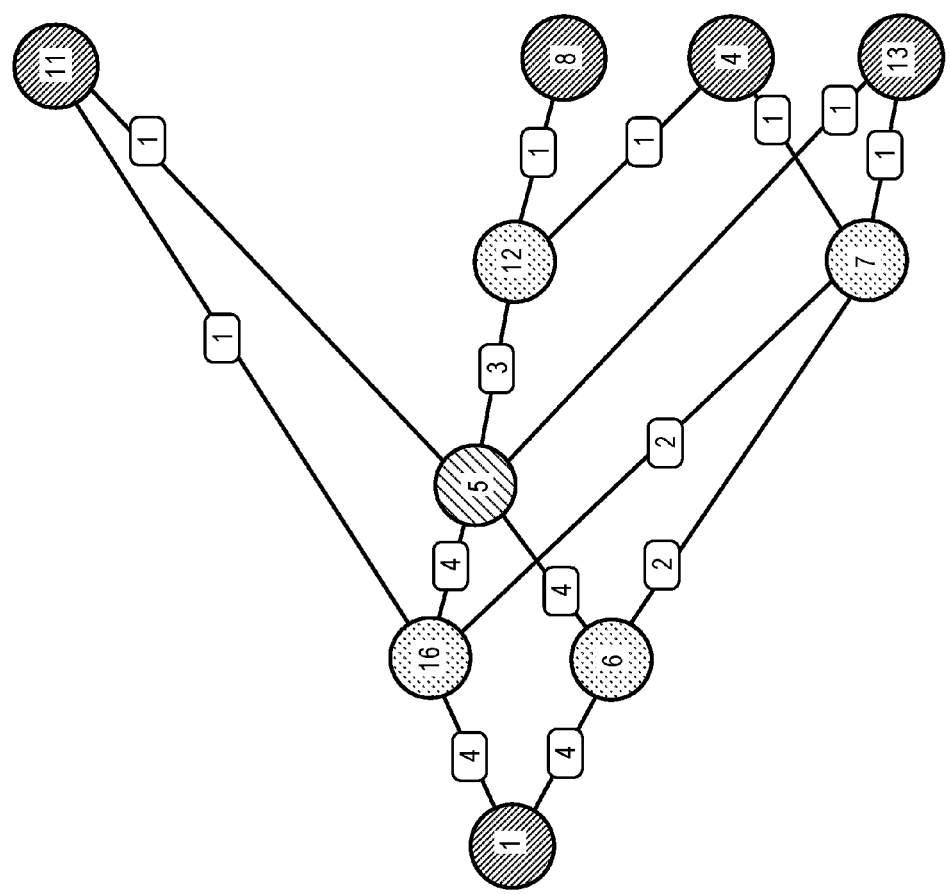

FIG. 9 is a diagram of the network topology graph after the (S, G) graph is simplified by removing non-leaf non-candidate nodes. This leaves roots, leaves and candidate replication points with the links between these nodes as needed. The PSL counts for these links are the summation of the simplified links. In a further simplification, pinned and pseudo-leaves can be identified. For example, node 8 has a unique shortest path as far as node 5, such that node 5 is a pseudo-leaf for node 8. Similarly, node 12 is on a pinned path between node 5 and node 8 as it is on the only path to node 8. Thus, any simplification involving these nodes must take this into consideration.

Figure 10:
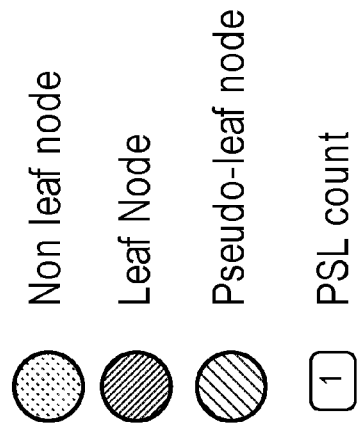
FIG. 10 is a diagram of the graph of the topology of the network where triangles are identified and considered for simplification.
Figure 10:
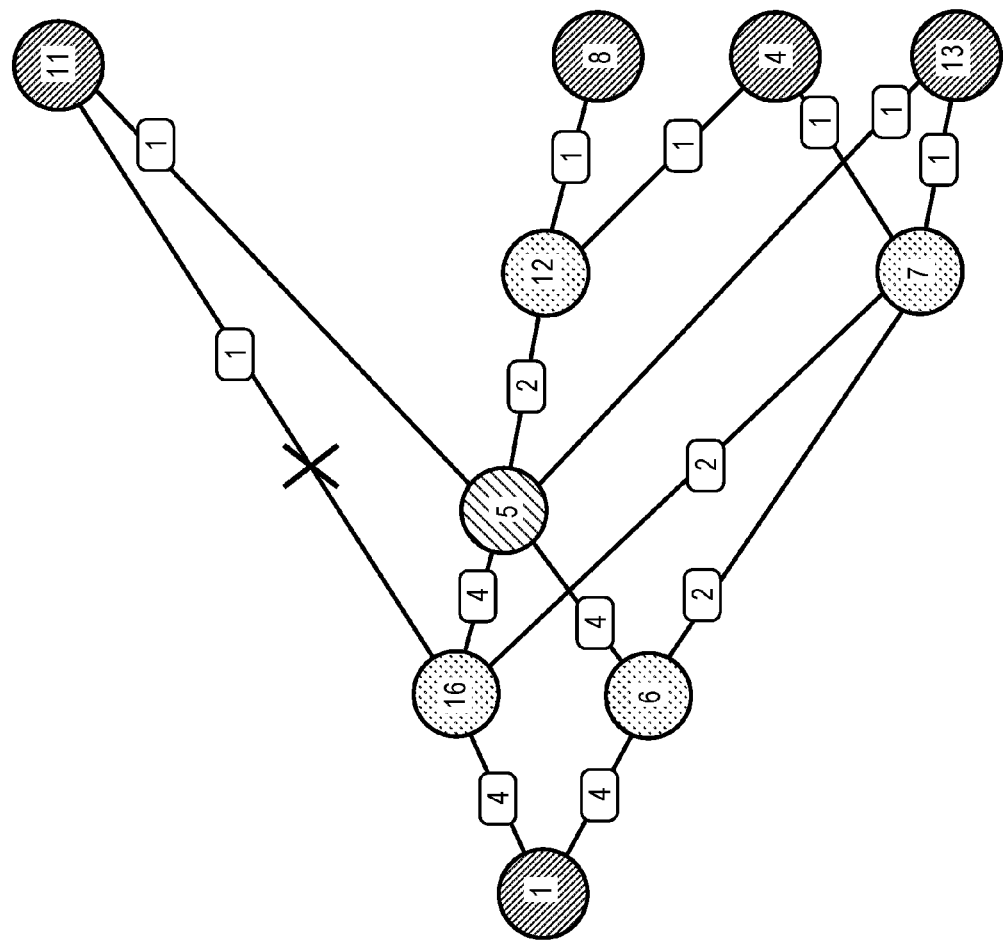

FIG. 10 is a diagram of the graph of the topology of the network where triangles are identified and considered for simplification. In this example, a triangle can be identified involving nodes 16, 5 and 11. The triangle pruning process always eliminates the long side of the triangle, therefore, the removal of the link 16-11 is performed.

Figure 11:
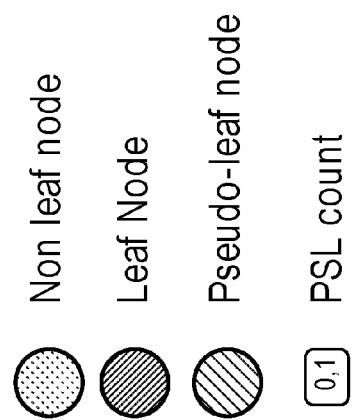
FIG. 11 is a diagram of the graph of the simplified network topology where consideration of leaf and pseudo-leaf pruning is made.
Figure 11:
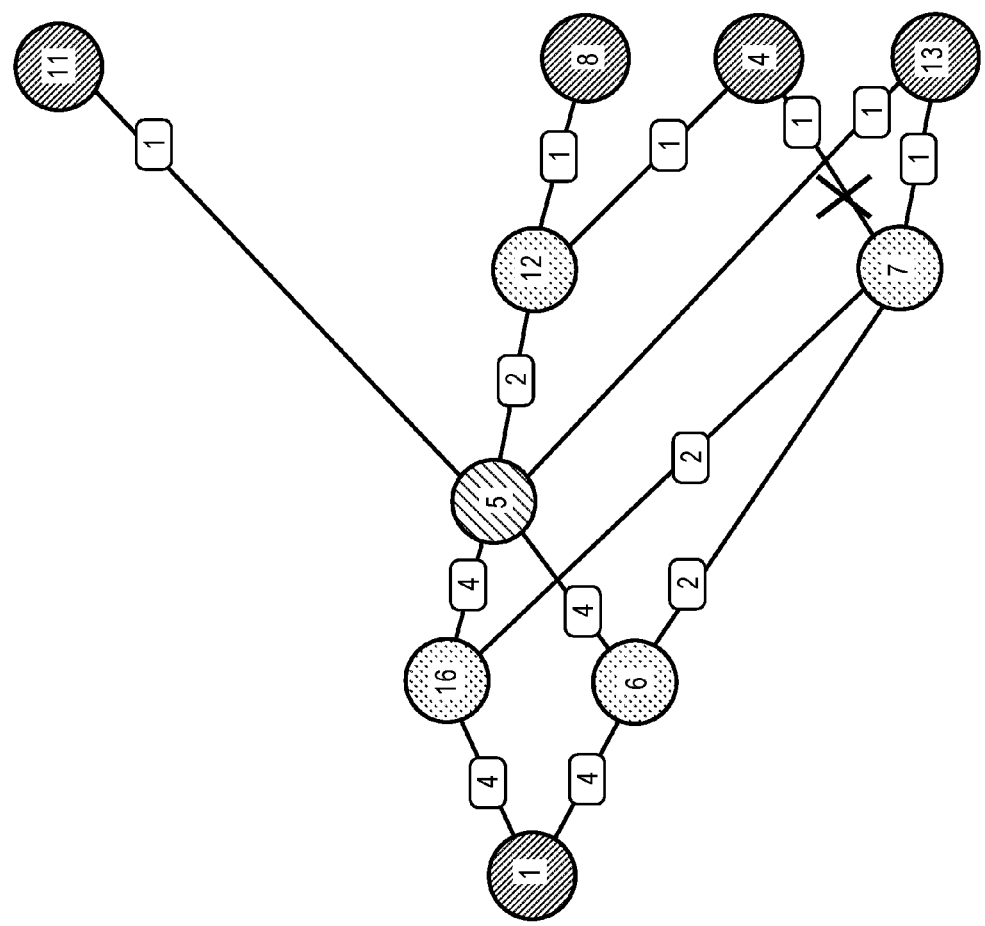

FIG. 11 is a diagram of the graph of the simplified network topology where consideration of leaf and pseudo-leaf pruning is made. In this step the path leading to leaves and pseudo-leaves are examined for pruning. The link 16-11 has been removed after the consideration of triangles. In this step, upstream links to the closest leaf or pinned path are preferred and other links removed. For example, node 4 has two upstream links. One leads to a pinned path the other just leads to replication point. Both are equidistant from 4. As the former has to be a component of the resulting MDT and the latter only "may" be, as the latter is considered inferior and can be pruned. Node 13 connects to the pinned path or pseudo-leaf of node 5, but has a closer potential replication point at node 7. Thus, the process does not perform any pruning related to these paths as there is not an authoritatively best choice. Similarly, the paths from node 5 do not present any opportunity for pruning. Nodes 6, 16, 12, 8 and 11 have only a single upstream adjacency and so no pruning is performed.

Figure 12:
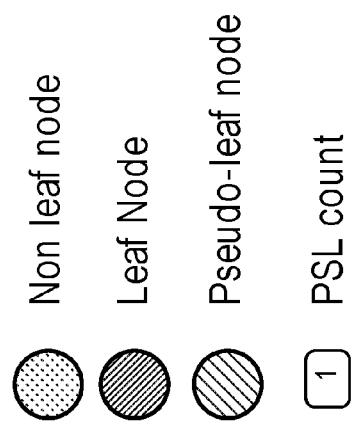
FIG. 12 is a diagram of the simplified graph of the network topology where downstream pruning is considered.
Figure 12:
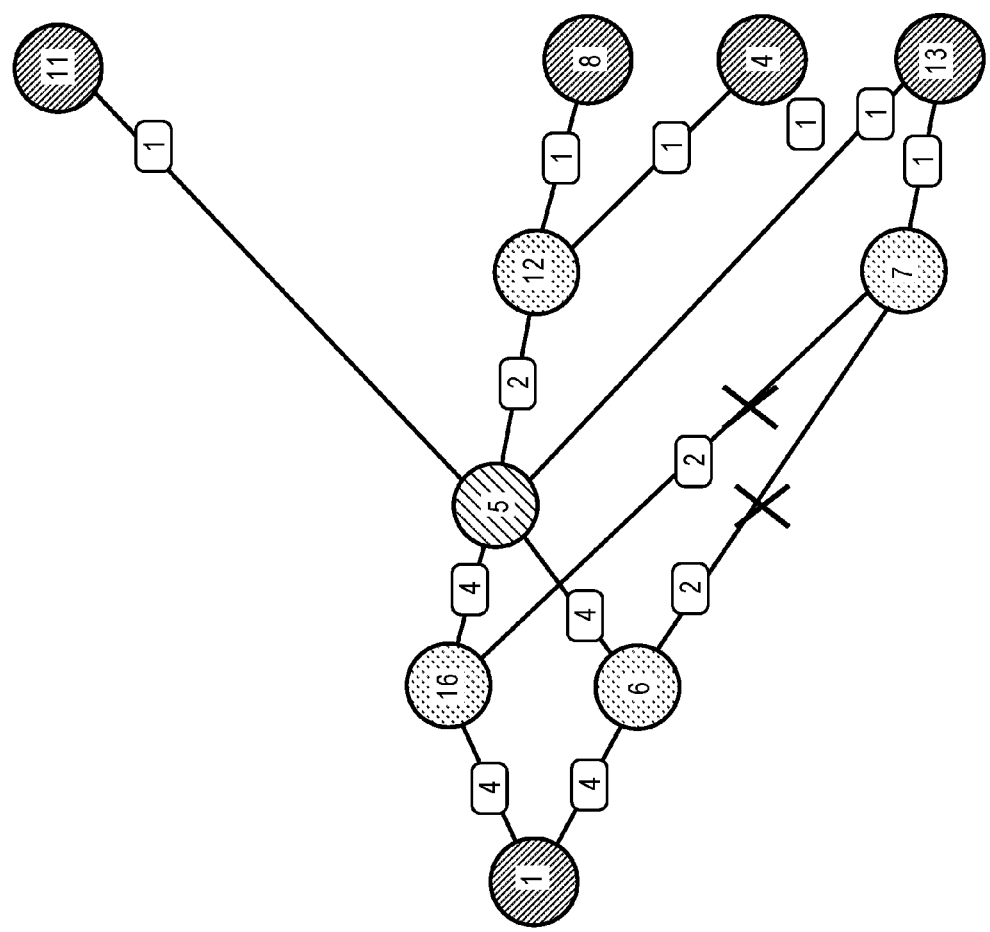

FIG. 12 is a diagram of the simplified graph of the network topology after initial pruning operations are performed. After the link 7-4 was eliminated, node 7 is no longer a replicating node. Therefore, it can be removed as a non-leaf and non-replicating node. In the example topology graph, the links 16-7 and 6-7 only lead ultimately to leaf 13. Each of these links and the node 7 and link 7-13 can be replaced with direct links from 16-13 and 6-13. Thus, the paths 16-7 and 6-7, as well as node 7 are identified to be pruned and new links to node 13 inserted in their place.

Figure 13:
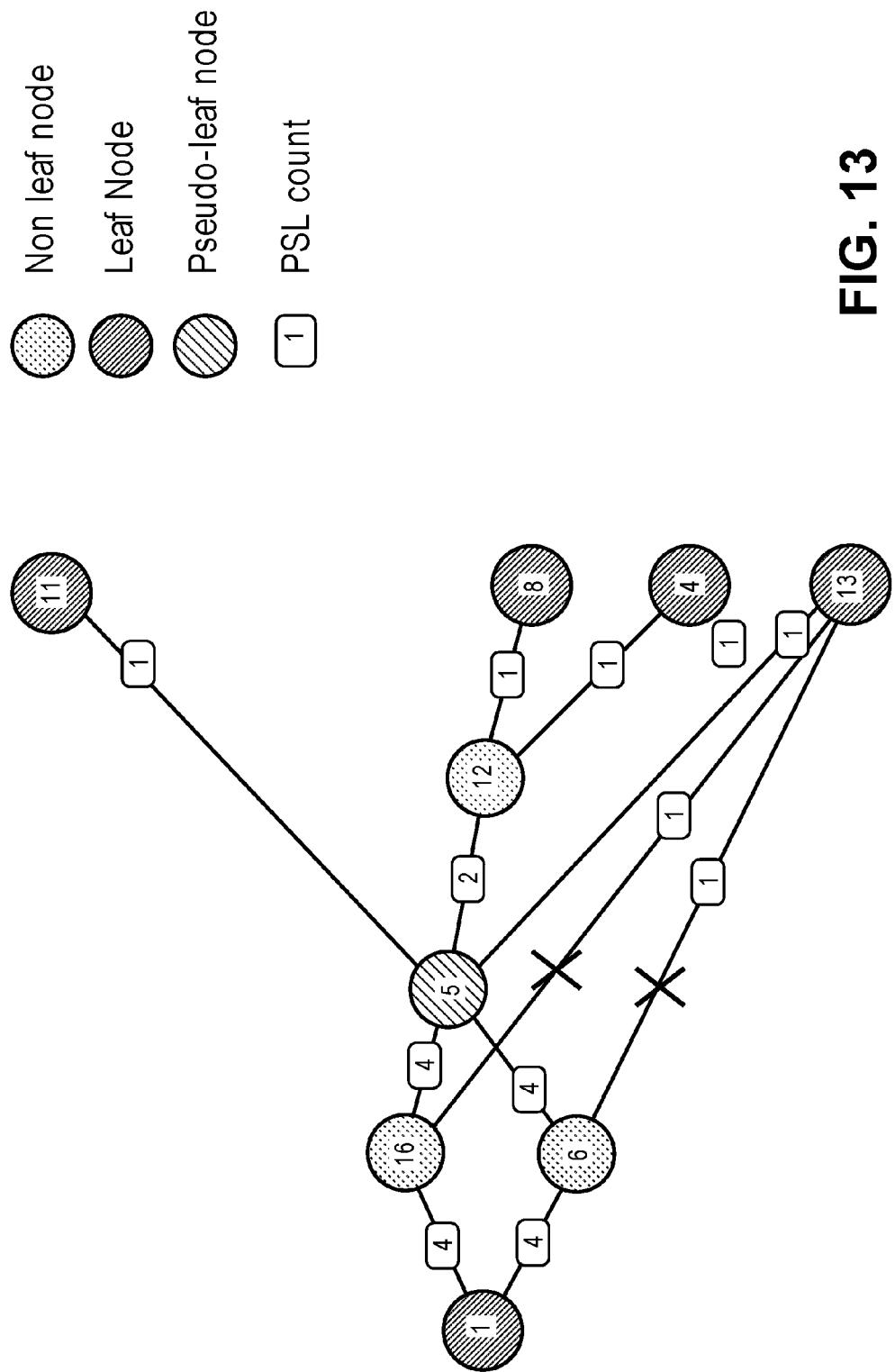
FIG. 13 is a diagram of one embodiment of a process to eliminate additional triangle configurations in the network topology.

FIG. 13 is a diagram of one embodiment of a process to eliminate additional triangle configurations in the network topology. After an initial run of pruning processes, additional structures such as triangles may be revealed in the topology graph. Thus, successive iterations of the processes can be employed to further resolve the topology graph. In this case, additional triangles are identified as 6-5-13 and 16-5-13. The long sides of each of these triangles can be eliminated, which results in the elimination of links 6-13 and 16-13.

Figure 14:
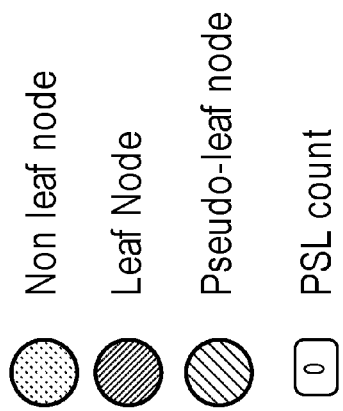
FIG. 14 is a diagram showing the simplified graph of the topology of the network where further iterations and adjustments are made to produce the final graph.
Figure 14:
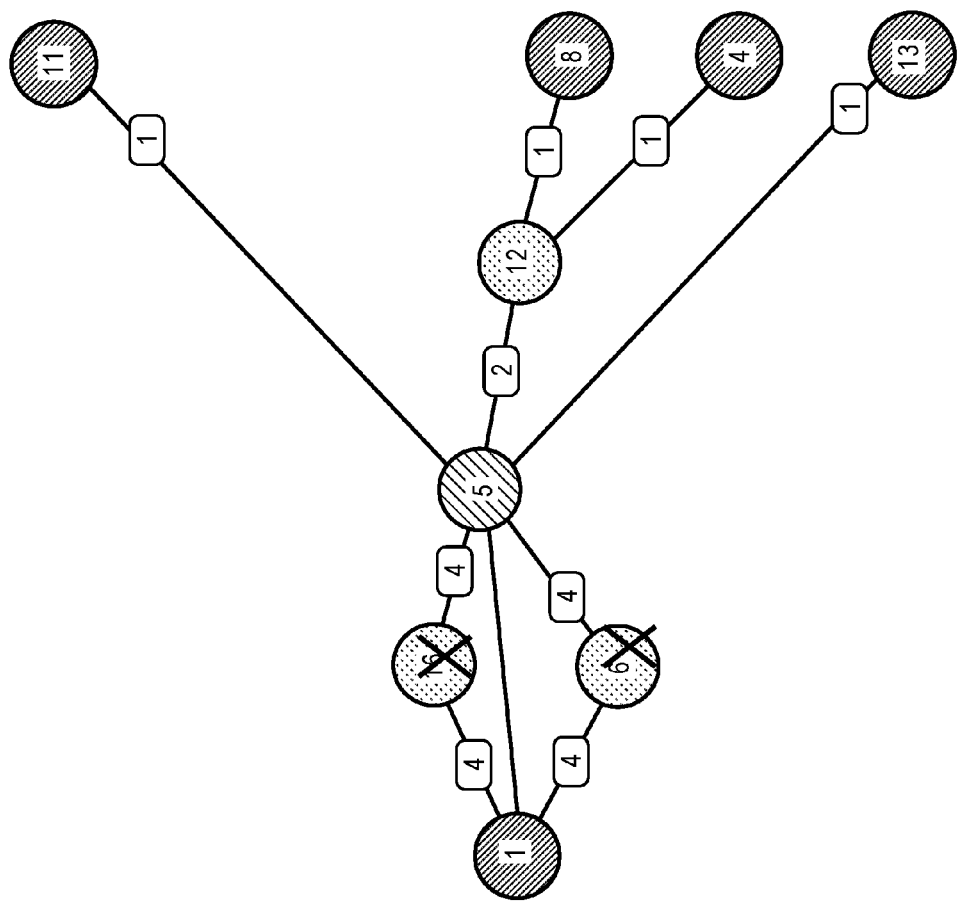

After the pruning of these paths, FIG. 14 is a diagram showing the simplified graph of the topology of the network where further iterations and adjustments are made to produce the final graph. In this stage, nodes 6 and 16 are recognized in a further pass as now being non-leaf and non-replication points, therefore they can be removed and the shortest path between node 1 and 5 utilized as the path.

These alterations can be made through successive iterations of the processes described above or as a separate step in the initial iteration on the graph to simplify it.

Figure 15:
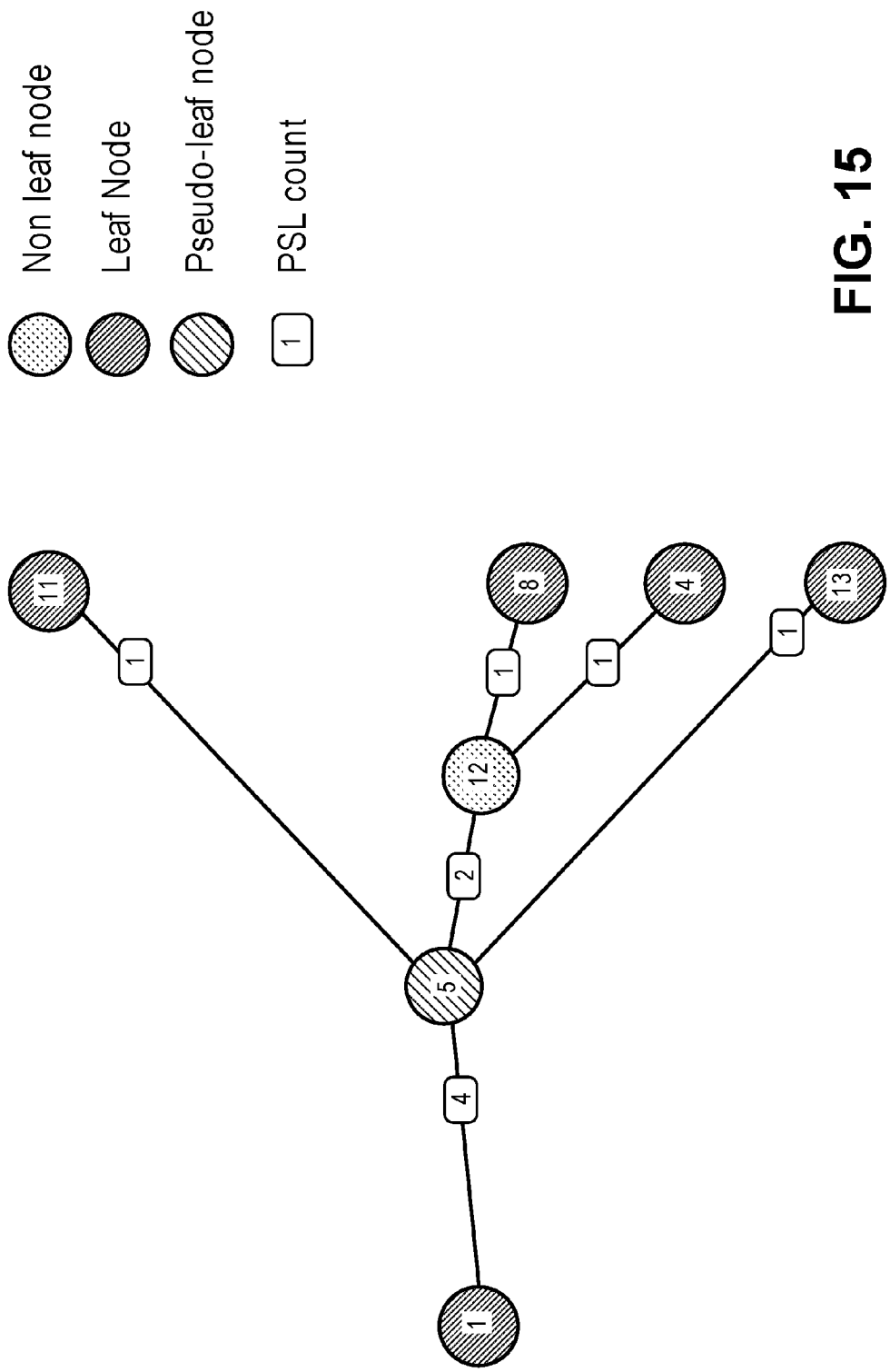
FIG. 15 is a diagram of a simplified graph of a network topology.
Figure 16:
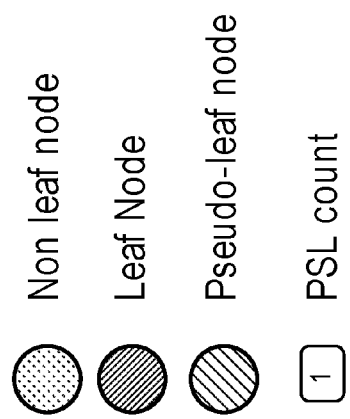
FIG. 16 is a diagram of the simplified graph mapped onto the original topology graph.
Figure 16:
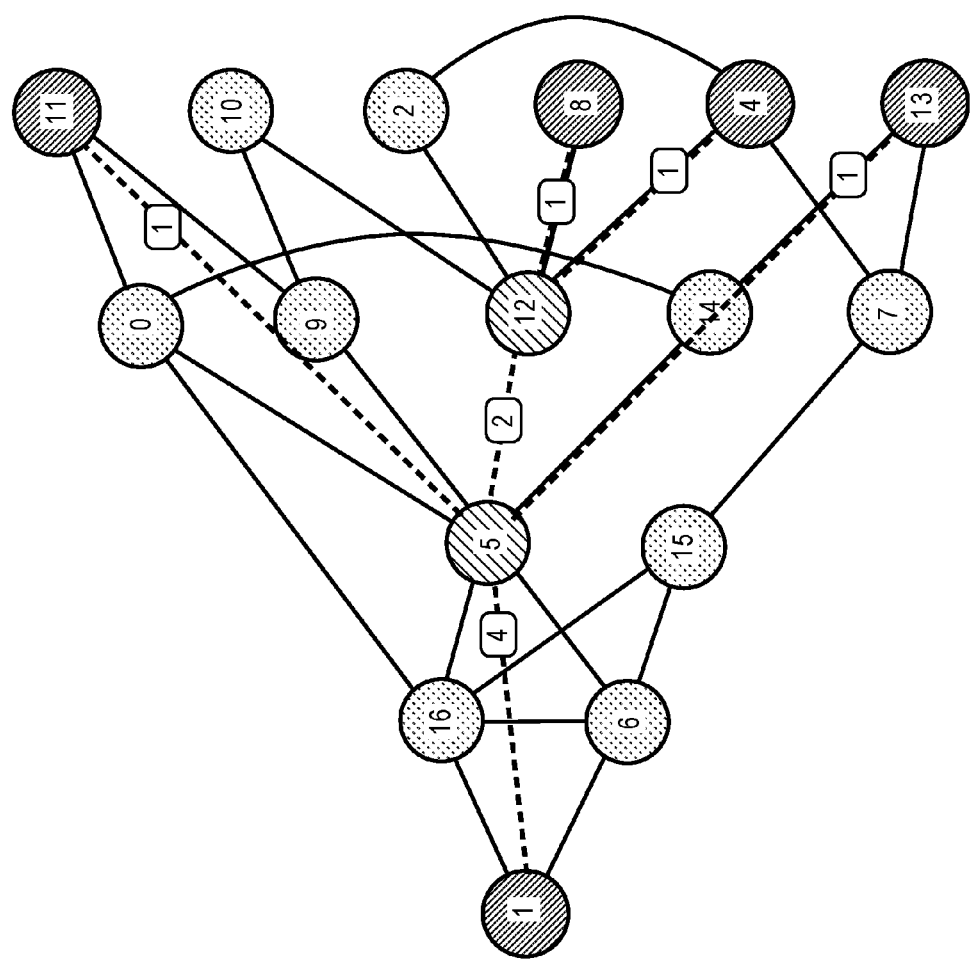
Figure 17:
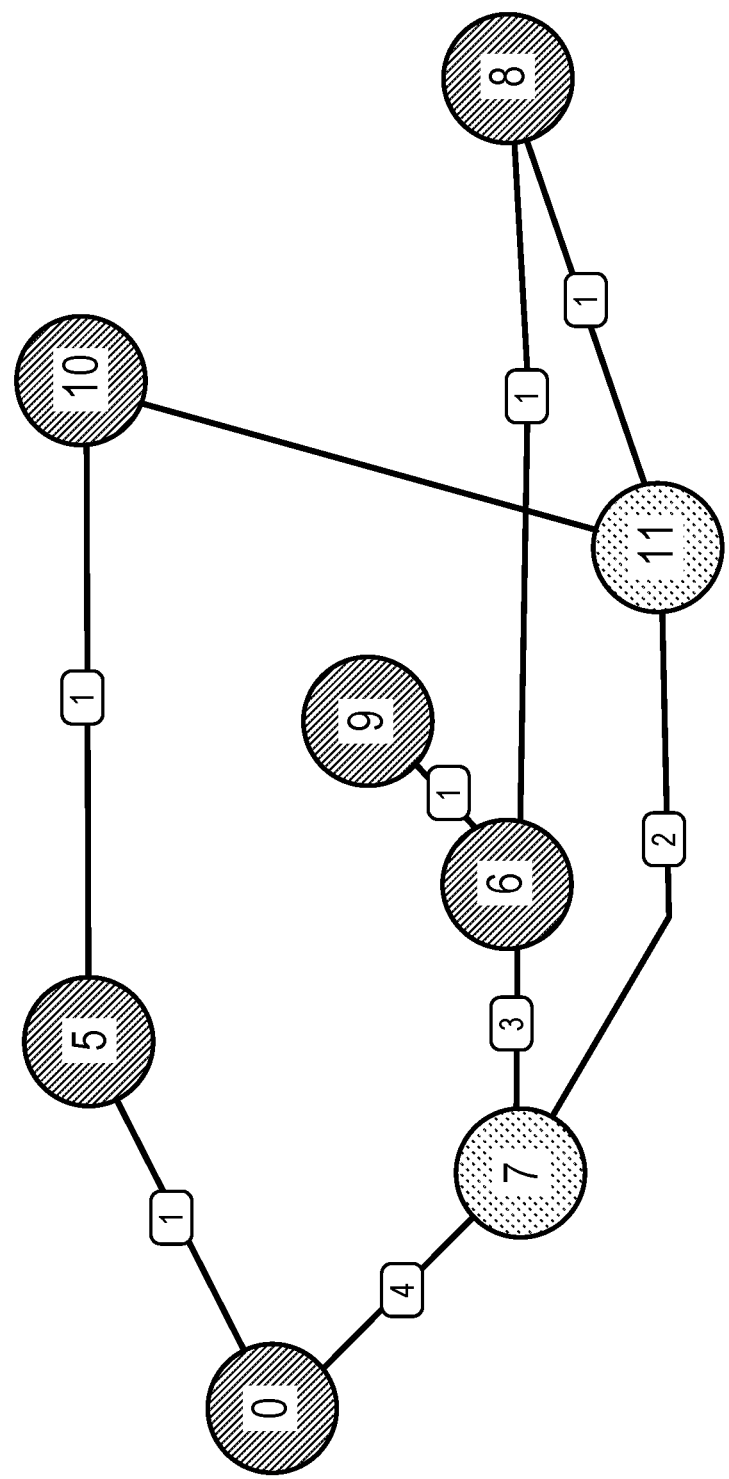
FIG. 17 is a diagram of a graph of an example network topology where additional processing may be employed to resolve the MDT or where sub-optimal simplified graphs are produced.

After these steps are completed, a complete graph is generated as shown in FIG. 15. FIG. 15 is a diagram of a simplified graph of a network topology. The simplification was performed using a set of "safe" processes and rules to prune links and nodes. As a result of the process the tree is fully resolved and it is a minimum cost so will not see any duplicate packets on links in the presence of ECMP forwarding. The nodes that remain in this graph need to install the requisite state for forwarding data traffic for the given multicast group from the source node 1 to each of the leaves that the multicast group serves, namely nodes 4, 8, 11 and 13. For comparison, FIG. 16 is a diagram of the simplified graph mapped onto the original topology graph.

Not all network topologies cleanly simplify and resolve into a final MDT. FIG. 16 is a diagram of a graph of an example network topology where additional processing may be employed to resolve the MDT or where sub-optimal simplified graphs are produced. In this example, nodes 5, 6 and 9 have been resolved. Nodes 8 and 11 have a closer potential replication point than any pinned path or leaf. Node 10 was closer to the root so was first to resolve. This results in a sub-optimal graph. However, the percentage of such graphs produced using the process is less than 1%, which represents an acceptable trade-off from the inefficiencies of the standard processes.

Thus, the embodiments set forth above provide an improved and more efficient method for generating and resolving efficient MDTs. This represents an improvement over the art, as the process of the embodiments is an implementation of the realization that it is not necessary to find complete connectivity, just the key nodes in a multicast tree. The use of metrics that allow when leaves have a unique path to the root in a pruned graph to be detected. The embodiments encompass, the application of simple pruning rules based on authoritative "this cannot happen in a minimum cost shortest path graph" permit a significant proportion of trees to be resolved directly and with significantly less computing requirements. The embodiments implement a process based on the notion that "perfection" is over emphasized in prior art processes and results in excessive complexity leading to it being intractable to produce an implementation guaranteed to produce a timely result. The key notion is being able to distinguish the trees that are authoritatively correct from those that are not, and agreeing on rules to resolve those that are not. As a result, trees successfully resolved via the simple pruning rules required no further checking, while the small percentage that did not resolve cleanly need simply be examined for suitability and fixed up as appropriate in this application using much less compute than an authoritative search of the tree space.

Figure 18:
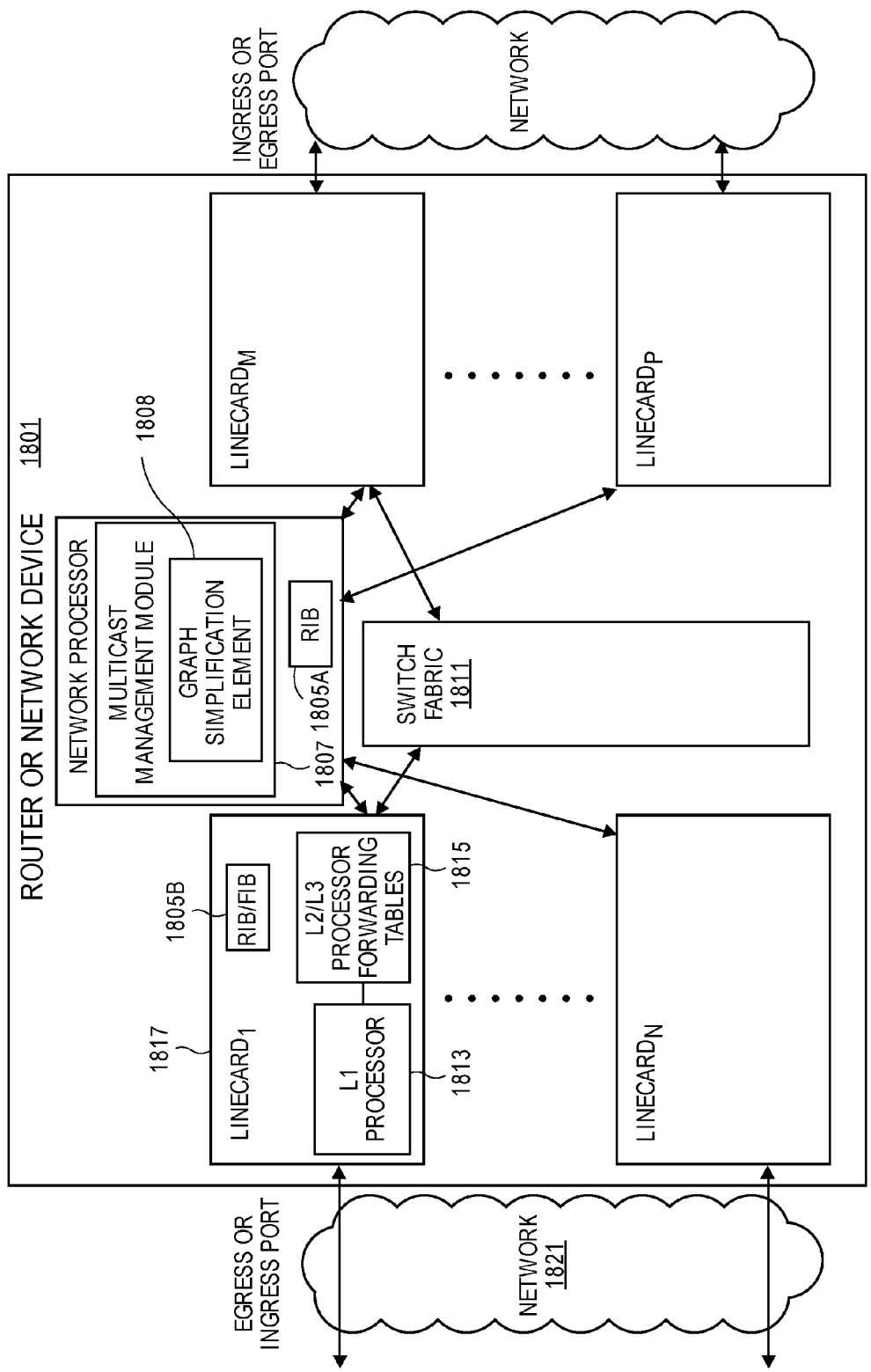
FIG. 18 is a diagram of one embodiment of the network device.

FIG. 18 is a diagram of one embodiment of the network device. In one embodiment, the determination and configuration of quick change IP channels is implemented by a network device 1801 or similar computing device. The network device 18601 can have any structure that enables it to receive data traffic (e.g., multicast data traffic) and forward it toward its destination. The network device 1801 can include a network processor 1803 or set of network processors that execute the functions of the network device 1801. A 'set,' as used herein, is any positive whole number of items including one item. The network device 1801 can execute a set of multicast management modules 1807 to implement the functions of configuring the network for proper handling of quick change IP channels forwarding of data packets across networks where the network device 1801 functions as a node in this network as described herein above via a network processor 1803.

The network device 1801 connects with separately administered networks that have user equipment and/or content servers. The network processor 1803 can implement the multicast management module(s) 1807 including a graph simplification element 1808 as a discrete hardware, software module or any combination thereof. The network processor 1803 can also service the routing information base 1805A and similar functions related to data traffic forwarding and network topology maintenance. The routing information base 1805A can be implemented as match action tables that are utilized for forwarding protocol data units PDUs (i.e. packets). The functions of the multicast management module(s) 1807 can be implemented as modules in any combination of software, including firmware, and hardware within the network device. The functions of the multicast management module(s) 1807 that are executed and implemented by the network device 1801 include those described further herein above.

In one embodiment, the network device 1801 can include a set of line cards 1817 that process and forward the incoming data traffic toward the respective destination nodes by identifying the destination and forwarding the data traffic to the appropriate line card 1817 having an egress port that leads to or toward the destination via a next hop. These line cards 1817 can also implement the forwarding information base and/label forwarding base 1805B, or a relevant subset thereof. The line cards 1817 can also implement or facilitate the multicast management module(s) 1807 functions described herein above. The line cards 1817 are in communication with one another via a switch fabric 1811 and communicate with other nodes over attached networks 1821 using Ethernet, fiber optic or similar communication links and media.

FIG. 19A illustrates connectivity between network devices (NDs) within an exemplary network, as well as three exemplary implementations of the NDs, according to some embodiments of the invention. FIG. 19A shows NDs 1900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1900A, E, and F illustrates that these NDs act as ingress and egress points for the network (and thus, these NDs are sometimes referred to as edge NDs; while the other NDs may be called core NDs).

Two of the exemplary ND implementations in FIG. 19A are: 1) a special-purpose network device 1902 that uses custom application-specific integrated-circuits (ASICs) and a proprietary operating system (OS); and 2) a general purpose network device 1904 that uses common off-the-shelf (COTS) processors and a standard OS.

The special-purpose network device 1902 includes networking hardware 1910 comprising compute resource(s) 1912 (which typically include a set of one or more processors), forwarding resource(s) 1914 (which typically include one or more ASICs and/or network processors), and physical network interfaces (NIs) 1916 (sometimes called physical ports), as well as non-transitory machine readable storage media 1918 having stored therein networking software 1920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1900A-H. During operation, the networking software 1920 may be executed by the networking hardware 1910 to instantiate a set of one or more networking software instance(s) 1922. Each of the networking software instance(s) 1922, and that part of the networking hardware 1910 that executes that network software instance (be it hardware dedicated to that networking software instance and/or time slices of hardware temporally shared by that networking software instance with others of the networking software instance(s) 1922), form a separate virtual network element 1930A-R. Each of the virtual network element(s) (VNEs) 1930A-R includes a control communication and configuration module 1932A-R (sometimes referred to as a local control module or control communication module) and forwarding table(s) 1934A-R, such that a given virtual network element (e.g., 1930A) includes the control communication and configuration module (e.g., 1932A), a set of one or more forwarding table(s) (e.g., 1934A), and that portion of the networking hardware 1910 that executes the virtual network element (e.g., 1930A).

Software 1920 can include code which when executed by networking hardware 1910, causes networking hardware 1910 to perform operations of one or more embodiments of the present invention as part networking software instances 1922. The software can include a graph simplification element 1931A as part of a multicast management module 1933A.

The special-purpose network device 1902 is often physically and/or logically considered to include: 1) a ND control plane 1924 (sometimes referred to as a control plane) comprising the compute resource(s) 1912 that execute the control communication and configuration module(s) 1932A-R; and 2) a ND forwarding plane 1926 (sometimes referred to as a forwarding plane, a data plane, or a media plane) comprising the forwarding resource(s) 1914 that utilize the forwarding table(s) 1934A-R and the physical NIs 1916. By way of example, where the ND is a router (or is implementing routing functionality), the ND control plane 1924 (the compute resource(s) 1912 executing the control communication and configuration module(s) 1932A-R) is typically responsible for participating in controlling how data (e.g., packets) is to be routed (e.g., the next hop for the data and the outgoing physical NI for that data) and storing that routing information in the forwarding table(s) 1934A-R, and the ND forwarding plane 1926 is responsible for receiving that data on the physical NIs 1916 and forwarding that data out the appropriate ones of the physical NIs 1916 based on the forwarding table(s) 1934A-R.

FIG. 19B illustrates an exemplary way to implement the special-purpose network device 1902 according to some embodiments of the invention. FIG. 19B shows a special-purpose network device including cards 1938 (typically hot pluggable). While in some embodiments the cards 1938 are of two types (one or more that operate as the ND forwarding plane 1926 (sometimes called line cards), and one or more that operate to implement the ND control plane 1924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1936 (e.g., a first full mesh coupling the line cards and a second full mesh coupling all of the cards).

Returning to FIG. 19A, the general purpose network device 1904 includes hardware 1940 comprising a set of one or more processor(s) 1942 (which are often COTS processors) and network interface controller(s) 1944 (NICs; also known as network interface cards) (which include physical NIs 1946), as well as non-transitory machine readable storage media 1948 having stored therein software 1950. During operation, the processor(s) 1942 execute the software 1950 to instantiate one or more sets of one or more applications 1964A-R. While one embodiment does not implement virtualization, alternative embodiments may use different forms of virtualization—represented by a virtualization layer 1954 and software containers 1962A-R. For example, one such alternative embodiment implements operating system-level virtualization, in which case the virtualization layer 1954 represents the kernel of an operating system (or a shim executing on a base operating system) that allows for the creation of multiple software containers 1962A-R that may each be used to execute one of the sets of applications 1964A-R. In this embodiment, the multiple software containers 1962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 1954 represents a hypervisor (sometimes referred to as a virtual machine monitor (VMM)) or a hypervisor executing on top of a host operating system; and 2) the software containers 1962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide paravirtualization which allows an operating system or application to be aware of the presence of virtualization for optimization purposes.

The instantiation of the one or more sets of one or more applications 1964A-R, as well as the virtualization layer 1954 and software containers 1962A-R if implemented, are collectively referred to as software instance(s) 1952. Each set of applications 1964A-R, corresponding software container 1962A-R if implemented, and that part of the hardware 1940 that executes them (be it hardware dedicated to that execution and/or time slices of hardware temporally shared by software containers 1962A-R), forms a separate virtual network element(s) 1960A-R.

The virtual network element(s) 1960A-R perform similar functionality to the virtual network element(s) 1930A-R—e.g., similar to the control communication and configuration module(s) 1932A and forwarding table(s) 1934A (this virtualization of the hardware 1940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 1962A-R differently. For example, while embodiments of the invention are illustrated with each software container 1962A-R corresponding to one VNE 1960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1962A-R to VNEs also apply to embodiments where such a finer level of granularity is used.

In certain embodiments, the virtualization layer 1954 includes a virtual switch that provides similar forwarding services as a physical Ethernet switch. Specifically, this virtual switch forwards traffic between software containers 1962A-R and the NIC(s) 1944, as well as optionally between the software containers 1962A-R; in addition, this virtual switch may enforce network isolation between the VNEs 1960A-R that by policy are not permitted to communicate with each other (e.g., by honoring virtual local area networks (VLANs)).

Software 1950 can include code which when executed by processor(s) 1942, cause processor(s) 1942 to perform operations of one or more embodiments of the present invention as part software containers 1962A-R. The software 1950 includes a multicast management module 1964A-R, which includes the graph simplification element 1965A-R implementing the processes described herein above.

The third exemplary ND implementation in FIG. 19A is a hybrid network device 1906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1902) could provide for para-virtualization to the networking hardware present in the hybrid network device 1906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1930A-R, VNEs 1960A-R, and those in the hybrid network device 1906) receives data on the physical NIs (e.g., 1916, 1946) and forwards that data out the appropriate ones of the physical NIs (e.g., 1916, 1946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 19C:
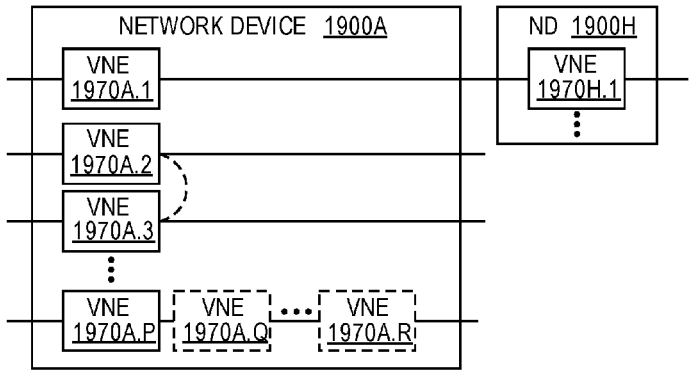
FIG. 19C illustrates various exemplary ways in which virtual network elements (VNEs) may be coupled according to some embodiments of the invention.

FIG. 19C illustrates various exemplary ways in which VNEs may be coupled according to some embodiments of the invention. FIG. 19C shows VNEs 1970A.1-1970A.P (and optionally VNEs 1970A.Q-1970A.R) implemented in ND 1900A and VNE 1970H.1 in ND 1900H. In FIG. 19C, VNEs 1970A.1-P are separate from each other in the sense that they can receive packets from outside ND 1900A and forward packets outside of ND 1900A; VNE 1970A.1 is coupled with VNE 1970H.1, and thus they communicate packets between their respective NDs; VNE 1970A.2-1970A.3 may optionally forward packets between themselves without forwarding them outside of the ND 1900A; and VNE 1970A.P may optionally be the first in a chain of VNEs that includes VNE 1970A.Q followed by VNE 1970A.R (this is sometimes referred to as dynamic service chaining, where each of the VNEs in the series of VNEs provides a different service—e.g., one or more layer 4-7 network services). While FIG. 19C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 19A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 19A may also host one or more such servers (e.g., in the case of the general purpose network device 1904, one or more of the software containers 1962A-R may operate as servers; the same would be true for the hybrid network device 1906; in the case of the special-purpose network device 1902, one or more such servers could also be run on a virtualization layer executed by the compute resource(s) 1912); in which case the servers are said to be co-located with the VNEs of that ND.

A virtual network is a logical abstraction of a physical network (such as that in FIG. 19A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 19D:
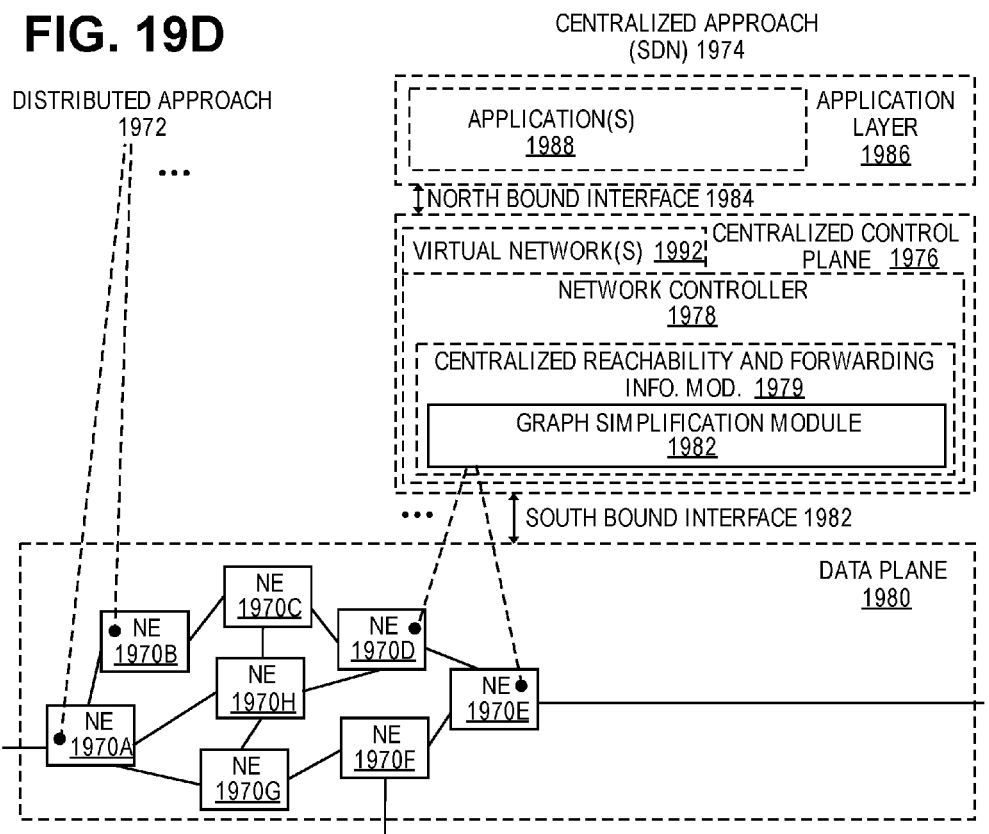
FIG. 19D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 19D illustrates a network with a single network element on each of the NDs of FIG. 19A, and within this straight forward approach contrasts a traditional distributed approach (commonly used by traditional routers) with a centralized approach for maintaining reachability and forwarding information (also called network control), according to some embodiments of the invention. Specifically, FIG. 19D illustrates network elements (NEs) 1970A-H with the same connectivity as the NDs 1900A-H of FIG. 19A.

FIG. 19D illustrates that the distributed approach 1972 distributes responsibility for generating the reachability and forwarding information across the NEs 1970A-H; in other words, the process of neighbor discovery and topology discovery is distributed.

For example, where the special-purpose network device 1902 is used, the control communication and configuration module(s) 1932A-R of the ND control plane 1924 typically include a reachability and forwarding information module to implement one or more routing protocols (e.g., an exterior gateway protocol such as Border Gateway Protocol (BGP), or Interior Gateway Protocol(s) (IGP) (e.g., Open Shortest Path First (OSPF), Intermediate System to Intermediate System (IS-IS), Routing Information Protocol (RIP)). Thus, the NEs 1970A-H (e.g., the compute resource(s) 1912 executing the control communication and configuration module(s) 1932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1924. The ND control plane 1924 programs the ND forwarding plane 1926 with information (e.g., adjacency and route information) based on the routing structure(s). For example, the ND control plane 1924 programs the adjacency and route information into one or more forwarding table(s) 1934A-R (e.g., Forwarding Information Base (FIB), Label Forwarding Information Base (LFIB), and one or more adjacency structures) on the ND forwarding plane 1926. For layer 2 forwarding, the ND can store one or more bridging tables that are used to forward data based on the layer 2 information in that data. While the above example uses the special-purpose network device 1902, the same distributed approach 1972 can be implemented on the general purpose network device 1904 and the hybrid network device 1906.

FIG. 19D illustrates that a centralized approach 1974 (also known as software defined networking (SDN)) that decouples the system that makes decisions about where traffic is sent from the underlying systems that forwards traffic to the selected destination. The illustrated centralized approach 1974 has the responsibility for the generation of reachability and forwarding information in a centralized control plane 1976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1976 has a south bound interface 1982 with a data plane 1980 (sometime referred to the infrastructure layer, network forwarding plane, or forwarding plane (which should not be confused with a ND forwarding plane)) that includes the NEs 1970A-H (sometimes referred to as switches, forwarding elements, data plane elements, or nodes). The centralized control plane 1976 includes a network controller 1978, which includes a centralized reachability and forwarding information module 1979 that determines the reachability within the network and distributes the forwarding information to the NEs 1970A-H of the data plane 1980 over the south bound interface 1982 (which may use the OpenFlow protocol). Thus, the network intelligence is centralized in the centralized control plane 1976 executing on electronic devices that are typically separate from the NDs.

In one embodiment, the centralized reachability and forwarding information module 1979 may include a multicast management module 1881 and graph simplification module 1882 performing operations as described herein above.

For example, where the special-purpose network device 1902 is used in the data plane 1980, each of the control communication and configuration module(s) 1932A-R of the ND control plane 1924 typically include a control agent that provides the VNE side of the south bound interface 1982. In this case, the ND control plane 1924 (the compute resource(s) 1912 executing the control communication and configuration module(s) 1932A-R) performs its responsibility for participating in controlling how data (e.g., packets) is to be routed (e.g., the next hop for the data and the outgoing physical NI for that data) through the control agent communicating with the centralized control plane 1976 to receive the forwarding information (and in some cases, the reachability information) from the centralized reachability and forwarding information module 1979 (it should be understood that in some embodiments of the invention, the control communication and configuration module(s) 1932A-R, in addition to communicating with the centralized control plane 1976, may also play some role in determining reachability and/or calculating forwarding information—albeit less so than in the case of a distributed approach; such embodiments are generally considered to fall under the centralized approach 1974, but may also be considered a hybrid approach).

While the above example uses the special-purpose network device 1902, the same centralized approach 1974 can be implemented with the general purpose network device 1904 (e.g., each of the VNE 1960A-R performs its responsibility for controlling how data (e.g., packets) is to be routed (e.g., the next hop for the data and the outgoing physical NI for that data) by communicating with the centralized control plane 1976 to receive the forwarding information (and in some cases, the reachability information) from the centralized reachability and forwarding information module 1979; it should be understood that in some embodiments of the invention, the VNEs 1960A-R, in addition to communicating with the centralized control plane 1976, may also play some role in determining reachability and/or calculating forwarding information—albeit less so than in the case of a distributed approach) and the hybrid network device 1906. In fact, the use of SDN techniques can enhance the NFV techniques typically used in the general purpose network device 1904 or hybrid network device 1906 implementations as NFV is able to support SDN by providing an infrastructure upon which the SDN software can be run, and NFV and SDN both aim to make use of commodity server hardware and physical switches.

FIG. 19D also shows that the centralized control plane 1976 has a north bound interface 1984 to an application layer 1986, in which resides application(s) 1988. The centralized control plane 1976 has the ability to form virtual networks 1992 (sometimes referred to as a logical forwarding plane, network services, or overlay networks (with the NEs 1970A-H of the data plane 1980 being the underlay network)) for the application(s) 1988. Thus, the centralized control plane 1976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 19D shows the distributed approach 1972 separate from the centralized approach 1974, the effort of network control may be distributed differently or the two combined in certain embodiments of the invention. For example: 1) embodiments may generally use the centralized approach (SDN) 1974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1974, but may also be considered a hybrid approach.

While FIG. 19D illustrates the simple case where each of the NDs 1900A-H implements a single NE 1970A-H, it should be understood that the network control approaches described with reference to FIG. 19D also work for networks where one or more of the NDs 1900A-H implement multiple VNEs (e.g., VNEs 1930A-R, VNEs 1960A-R, those in the hybrid network device 1906). Alternatively or in addition, the network controller 1978 may also emulate the implementation of multiple VNEs in a single ND. Specifically, instead of (or in addition to) implementing multiple VNEs in a single ND, the network controller 1978 may present the implementation of a VNE/NE in a single ND as multiple VNEs in the virtual networks 1992 (all in the same one of the virtual network(s) 1992, each in different ones of the virtual network(s) 1992, or some combination). For example, the network controller 1978 may cause an ND to implement a single VNE (a NE) in the underlay network, and then logically divide up the resources of that NE within the centralized control plane 1976 to present different VNEs in the virtual network(s) 1992 (where these different VNEs in the overlay networks are sharing the resources of the single VNE/NE implementation on the ND in the underlay network).

Figure 19E:
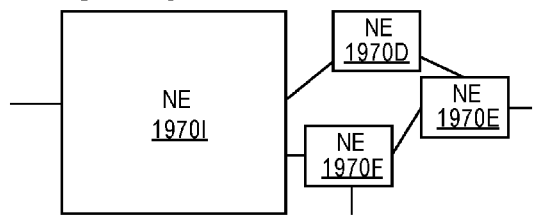
FIG. 19E illustrates the simple case of where each of the NDs implements a single NE, but a centralized control plane has abstracted multiple of the NEs in different NDs into (to represent) a single NE in one of the virtual network(s), according to some embodiments of the invention.
Figure 19F:
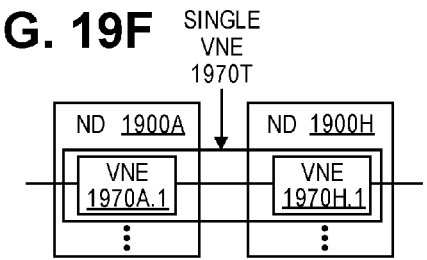
FIG. 19F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 19E and 19F respectively illustrate exemplary abstractions of NEs and VNEs that the network controller 1978 may present as part of different ones of the virtual networks 1992. FIG. 19E illustrates the simple case of where each of the NDs 1900A-H implements a single NE 1970A-H (see FIG. 19D), but the centralized control plane 1976 has abstracted multiple of the NEs in different NDs (the NEs 1970A-C and G-H) into (to represent) a single NE 1970I in one of the virtual network(s) 1992 of FIG. 19D, according to some embodiments of the invention. FIG. 19E shows that in this virtual network, the NE 1970I is coupled to NE 1970D and 1970F, which are both still coupled to NE 1970E.

FIG. 19F illustrates a case where multiple VNEs (VNE 1970A.1 and VNE 1970H.1) are implemented on different NDs (ND 1900A and ND 1900H) and are coupled to each other, and where the centralized control plane 1976 has abstracted these multiple VNEs such that they appear as a single VNE 1970T within one of the virtual networks 1992 of FIG. 19D, according to some embodiments of the invention. Thus, the abstraction of a NE or VNE can span multiple NDs.

While some embodiments of the invention implement the centralized control plane 1976 as a single entity (e.g., a single instance of software running on a single electronic device), alternative embodiments may spread the functionality across multiple entities for redundancy and/or scalability purposes (e.g., multiple instances of software running on different electronic devices).

Figure 20:
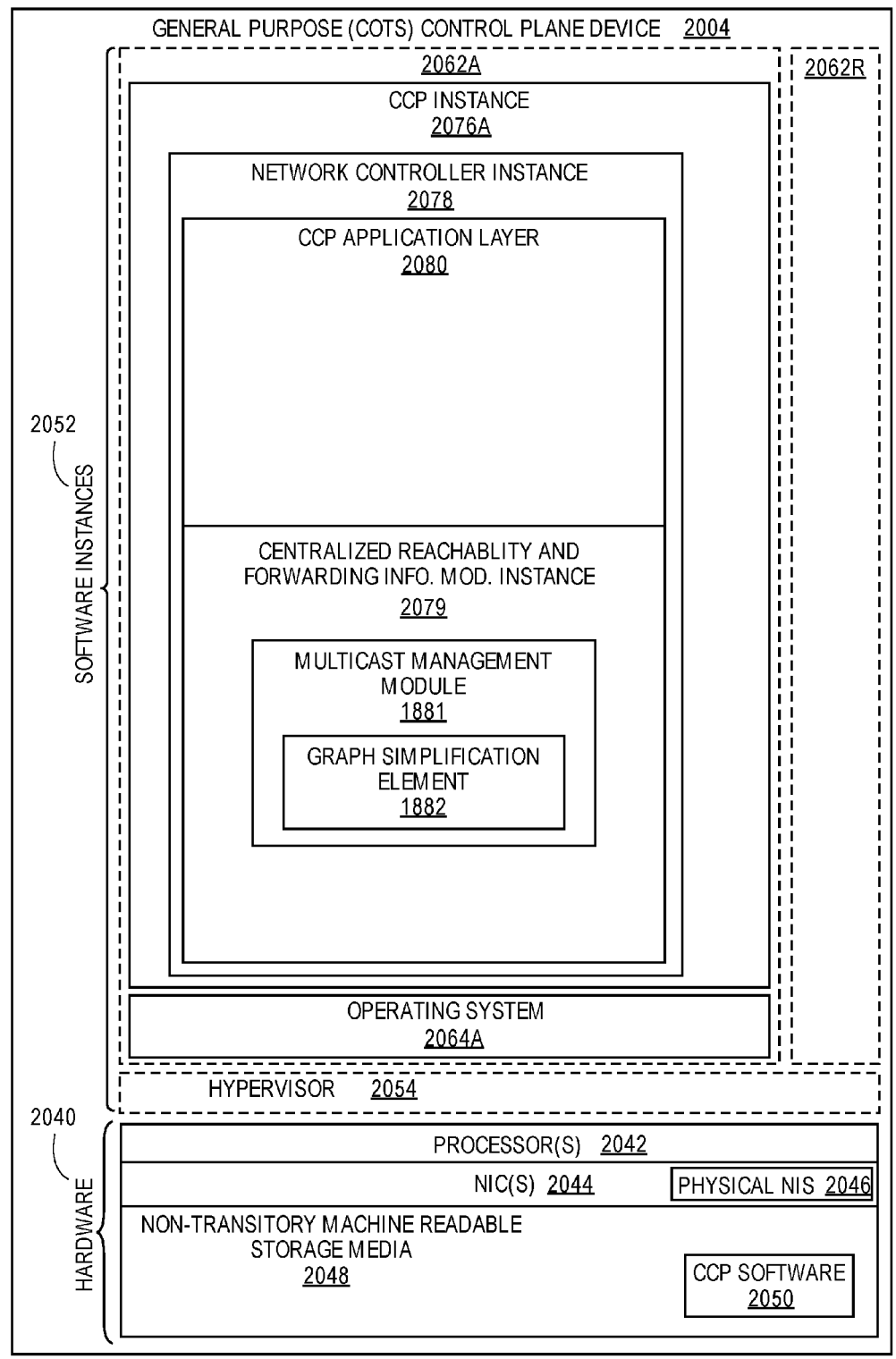
FIG. 20 illustrates a general purpose control plane device with centralized control plane (CCP) software, according to some embodiments of the invention.

Similar to the network device implementations, the electronic device(s) running the centralized control plane 1976, and thus the network controller 1978 including the centralized reachability and forwarding information module 1979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 20 illustrates, a general purpose control plane device 2004 including hardware 2040 comprising a set of one or more processor(s) 2042 (which are often COTS processors) and network interface controller(s) 2044 (NICs; also known as network interface cards) (which include physical NIs 2046), as well as non-transitory machine readable storage media 2048 having stored therein centralized control plane (CCP) software 2050.

In one embodiment, the centralized reachability and forwarding information module 2079 may include a multicast management module 1881 and graph simplification module 1882 performing operations as described herein above.

In embodiments that use compute virtualization, the processor(s) 2042 typically execute software to instantiate a virtualization layer 2054 and software container(s) 2062A-R (e.g., with operating system-level virtualization, the virtualization layer 2054 represents the kernel of an operating system (or a shim executing on a base operating system) that allows for the creation of multiple software containers 2062A-R (representing separate user space instances and also called virtualization engines, virtual private servers, or jails) that may each be used to execute a set of one or more applications; with full virtualization, the virtualization layer 2054 represents a hypervisor (sometimes referred to as a virtual machine monitor (VMM)) or a hypervisor executing on top of a host operating system, and the software containers 2062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 2050 (illustrated as CCP instance 2076A) is executed within the software container 2062A on the virtualization layer 2054. In embodiments where compute virtualization is not used, the CCP instance 2076A on top of a host operating system is executed on the "bare metal" general purpose control plane device 2004. The instantiation of the CCP instance 2076A, as well as the virtualization layer 2054 and software containers 2062A-R if implemented, are collectively referred to as software instance(s) 2052.

In some embodiments, the CCP instance 2076A includes a network controller instance 2078. The network controller instance 2078 includes a centralized reachability and forwarding information module instance 2079 (which is a middleware layer providing the context of the network controller 1978 to the operating system and communicating with the various NEs), and an CCP application layer 2080 (sometimes referred to as an application layer) over the middleware layer (providing the intelligence required for various network operations such as protocols, network situational awareness, and user-interfaces). At a more abstract level, this CCP application layer 2080 within the centralized control plane 1976 works with virtual network view(s) (logical view(s) of the network) and the middleware layer provides the conversion from the virtual networks to the physical view.

The centralized control plane 1976 transmits relevant messages to the data plane 1980 based on CCP application layer 2080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1980 may receive different messages, and thus different forwarding information. The data plane 1980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1980, the packet (or a subset of the packet header and content) is typically forwarded to the centralized control plane 1976. The centralized control plane 1976 will then program forwarding table entries into the data plane 1980 to accommodate packets belonging to the flow of the unknown packet. Once a specific forwarding table entry has been programmed into the data plane 1980 by the centralized control plane 1976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device to simplify a topology graph of a network and to generate a multicast distribution tree, the method to reduce complexity of the topology graph such that a computational complexity of generating the multicast distribution tree is reduced, the method comprising:
   computing a shortest path to all nodes of the topology graph rooted at a source node S;
   determining a metric for each adjacency on each shortest path of the topology graph for a multicast group G;
   constructing an (S, G) graph with only source node S, leaves and candidate replication points; and
   pruning the (S, G) graph using a first set of pruning processes to fully resolve the multicast distribution tree, where full resolution can be determined, and the first set of pruning processes are known to produce a minimum cost tree.

2. The method of claim 1, wherein a failure to resolve the multicast distribution tree using the first set of pruning processes results in application of a second set of pruning processes that are not authoritative, combined with verification of the fully resolved multicast distribution tree.

3. The method of claim 1, wherein the first set of pruning processes includes any one or more of eliminating non-leaf non-candidate replication points in the (S, G) graph, eliminating triangles in the (S, G) graph, or selecting upstream links to replication points from leaves that have a lowest metric.

4. The method of claim 1, further comprising:
   checking whether the network device is in the (S, G) graph; and
   exiting computation of the method in response to the network device not being in the (S, G) graph.

5. The method of claim 1, further comprising:
   installing state in the network device based on the fully resolved multicast distribution tree generated.

6. The method of claim 1, wherein the metric is a potentially served leaf metric.

7. A network device configured to execute a method to simplify a topology graph of a network and to generate a multicast distribution tree, the method to reduce complexity of the topology graph such that a computational complexity of generating the multicast distribution tree is reduced, the network device comprising:
   a non-transitory machine readable storage medium having stored therein a graph simplification element; and
   a processor coupled to the non-transitory machine readable storage medium, the processor configured to execute the graph simplification element, the graph simplification element configured to compute a shortest path to all nodes of the topology graph rooted at a source node S, to determine a metric for each adjacency on each shortest path of the topology graph for a multicast group G, to construct an (S, G) graph with only source node S, leaves and candidate replication points, and to prune the (S, G) graph using a first set of pruning processes to fully resolve the multicast distribution tree, where full resolution can be determined, and the first set of pruning processes are known to produce a minimum cost tree.

8. The network device of claim 7, wherein a failure to resolve the multicast distribution tree using the first set of pruning processes results in application of a second set of pruning processes that are not authoritative combined with verification of the fully resolved multicast distribution tree.

9. The network device of claim 7, wherein the first set of pruning processes includes any one or more of eliminating non-leaf non-candidate replication points in the (S, G) graph, eliminating triangles in the (S, G) graph, or selecting upstream links to replication points from leaves that have a lowest metric.

10. The network device of claim 7, wherein the graph simplification element is further configured to check whether the network device is in the (S, G) graph, and to exit computation of the method in response to the network device not being in the (S, G) graph.

11. The network device of claim 7, wherein the graph simplification element is further configured to install state in the network device based on the fully resolved multicast distribution tree generated.

12. The network device of claim 7, wherein the metric is a potentially served leaf metric.

13. A computing device configured to execute a plurality of virtual machines, the plurality of virtual machines implementing network function virtualization (NFV), the computing device in communication with a network device, a virtual machine from the plurality of virtual machines configured to execute a method to simplify a topology graph of a network and to generate a multicast distribution tree, the method to reduce complexity of the topology graph such that a computational complexity of generating the multicast distribution tree is reduced, the network device comprising:
   a non-transitory machine readable storage medium having stored therein a graph simplification element; and
   a processor coupled to the non-transitory machine readable storage medium, the processor configured to execute the virtual machine, the virtual machine configured to execute the graph simplification element, the graph simplification element configured to compute a shortest path to all nodes of the topology graph rooted at a source node S, to determine a metric for each adjacency on each shortest path of the topology graph for a multicast group G, to construct an (S, G) graph with only source node S, leaves and candidate replication points, and to prune the (S, G) graph using a first set of pruning processes to fully resolve the multicast distribution tree, where full resolution can be determined, and the first set of pruning processes are known to produce a minimum cost tree.

14. The computing device of claim 13, wherein a failure to resolve the multicast distribution tree using the first set of pruning processes results in application of a second set of pruning processes that are not authoritative combined with verification of the fully resolved multicast distribution tree.

15. The computing device of claim 13, wherein the first set of pruning processes includes any one or more of eliminating non-leaf non-candidate replication points in the (S, G) graph, eliminating triangles in the (S, G) graph, or selecting upstream links to replication points from leaves that have a lowest metric.

16. The computing device of claim 13, wherein the graph simplification element is further configured to check whether the network device is in the (S, G) graph, and to exit computation of the method in response to the network device not being in the (S, G) graph.

17. The computing device of claim 13, wherein the graph simplification element is further configured to install state in the network device based on the fully resolved multicast distribution tree generated.

18. The computing device of claim 13, wherein the metric is a potentially served leaf metric.

19. A control plane device is configured to implement a control plane of a software defined networking (SDN) network including a network device, the control plane device configured to execute a method to simplify a topology graph of a network and to generate a multicast distribution tree, the method to reduce complexity of the topology graph such that a computational complexity of generating the multicast distribution tree is reduced, the control plane device comprising:
   a non-transitory machine readable storage medium having stored therein a graph simplification element; and
   a processor coupled to the non-transitory machine readable storage medium, the processor configured to execute the graph simplification element, the graph simplification element configured to compute a shortest path to all nodes of the topology graph rooted at a source node S, to determine a metric for each adjacency on each shortest path of the topology graph for a multicast group G, to construct an (S, G) graph with only source node S, leaves and candidate replication points, and to prune the (S, G) graph using a first set of pruning processes to fully resolve the multicast distribution tree, where full resolution can be determined, and the first set of pruning processes are known to produce a minimum cost tree.

20. The control plane device of claim 19, wherein a failure to resolve the multicast distribution tree using the first set of pruning processes results in application of a second set of pruning processes that are not authoritative combined with verification of the fully resolved multicast distribution tree.

21. The control plane device of claim 19, wherein the first set of pruning processes includes any one or more of eliminating non-leaf non-candidate replication points in the (S, G) graph, eliminating triangles in the (S, G) graph, or selecting upstream links to replication points from leaves that have a lowest metric.

22. The control plane device of claim 19, wherein the graph simplification element is further configured to check whether the network device is in the (S, G) graph, and to exit computation of the method in response to the network device not being in the (S, G) graph.

23. The control plane device of claim 19, wherein the graph simplification element is further configured to install state in the network device based on the fully resolved multicast distribution tree generated.

24. The control plane device of claim 19, wherein the metric is a potentially served leaf metric.

* * * * *